US012583025B2

(12) United States Patent (10) Patent No.: US 12,583,025 B2
Terasawa (45) Date of Patent: Mar. 24, 2026

(54) ROLL PRESS DEVICE AND CONTROL DEVICE

(71) Applicant: Panasonic Intellectual Property Management Co., Ltd., Osaka (JP)

(72) Inventor: Fumihiro Terasawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 839 days.

(21) Appl. No.: 17/791,817

(22) PCT Filed: Nov. 17, 2020

(86) PCT No.: PCT/JP2020/042738
§ 371 (c)(1),
(2) Date: Jul. 8, 2022

(87) PCT Pub. No.: WO2021/140748
PCT Pub. Date: Jul. 15, 2021

(65) Prior Publication Data
US 2023/0046202 A1 Feb. 16, 2023

(30) Foreign Application Priority Data
Jan. 9, 2020 (JP) ................................. 2020-002269

(51) Int. Cl.
B21B 37/38 (2006.01)
B30B 3/00 (2006.01)
H01M 4/04 (2006.01)
(52) U.S. Cl.
CPC ................ B21B 37/38 (2013.01); B30B 3/00 (2013.01); H01M 4/0435 (2013.01); B21B 2269/14 (2013.01)

(58) Field of Classification Search
CPC ....... B21B 15/26; B21B 37/16; B21B 37/165; B21B 37/18; B21B 37/38; B21B 37/42;
(Continued)

(56) References Cited

U.S. PATENT DOCUMENTS 6,185,973 B1 * 2/2001 Hayashi ................ B21B 13/147
72/242.4
2021/0086244 A1 * 3/2021 Nakajima ............... B21B 31/24

FOREIGN PATENT DOCUMENTS

| JP | 54-161565 | A |   | 12/1979 |
|----|-----------|---|---|---------|
| JP | 1-170511 | A |   | 7/1989 |
| JP | 2001347309 | A | * | 12/2001 |
| JP | 2013-111647 | A |   | 6/2013 |
| JP | 5280593 | B1 | * | 9/2013 |
| JP | 2014-042923 | A |   | 3/2014 |
| KR | 100314838 | B1 | * | 2/2002 |

OTHER PUBLICATIONS

JP-2001347309-A machine translation from FIT database (Year: 2025).*
(Continued)

*Primary Examiner* — Jeffrey T Carley
*Assistant Examiner* — Joshua D Anderson
(74) *Attorney, Agent, or Firm* — CANTOR COLBURN LLP

(57) ABSTRACT
A thickness meter detects a thickness of an electrode plate of a secondary battery at three or more points in a width direction of the electrode plate. A calculator calculates three feature amounts of a first deviation between the thickness target value and a thickness measurement value of a point closest to a first compression mechanism among the three or more points, a second deviation between the thickness target value and a thickness measurement value of a point closest to a second compression mechanism among the three or more points, and a secondary component of a thickness profile of the electrode plate from thickness measurement values at the three or more points and the thickness target value, and adaptively changes the setting values of the first
(Continued)

1 compression mechanism, the second compression mechanism, a first bend mechanism, and a second bend mechanism on the basis of the three feature amounts.

12 Claims, 12 Drawing Sheets

(58) Field of Classification Search
CPC ........ B21B 37/58; B21B 37/60; B21B 37/62;
B21B 38/04; B21B 2269/04; H01M
4/0435; Y10T 29/49112
See application file for complete search history.

(56) References Cited

OTHER PUBLICATIONS

JP-2013111647-A machine translation from FIT database (Year: 2025).*
JP-5280593-B1 machine translation from FIT database (Year: 2025).*
KR-100314838-B1 machine translation from FIT database (Year: 2025).*
International Search Report issued in corresponding International Application No. PCT/JP2020/042738, dated Jan. 26, 2021, with English translation.

* cited by examiner

ROLL PRESS DEVICE AND CONTROL DEVICE

CROSS-REFERENCE TO RELATED APPLICATIONS

This application is the U.S. National Phase under 35 U.S.C. § 371 of International Patent Application No. PCT/JP2020/042738, filed on Nov. 17, 2020, which in turn claims the benefit of Japanese Patent Application No. 2020-002269, filed on Jan. 9, 2020, the entire content of each of which is incorporated herein by reference.

TECHNICAL FIELD

The present disclosure relates to a roll press device that rolls an electrode plate of a secondary battery, and a control device.

BACKGROUND ART

In recent years, with the spread of electric vehicles (EV), hybrid vehicles (HV), and plug-in hybrid vehicles (PHV), shipment of secondary batteries increases. In particular, shipment of lithium ion secondary batteries increases. A general secondary battery includes a positive electrode, a negative electrode, a separator, and an electrolytic solution as main components. In a compression processing step which is one of steps of manufacturing a positive electrode plate and a negative electrode plate of the secondary battery, a roll press device is used (for example, refer to Patent Literature 1).

CITATION LIST

Patent Literature

[Patent Literature 1] JP 2013-111647 A

SUMMARY OF INVENTION

In a compression processing step of an electrode plate in the roll press device, generally, thickness accuracy of about 2 μm or less is required. A change in the coating film thickness of an electrode material in a previous step or a change in the roll outer diameter due to processing heat or bearing heat caused by compression in a compression step causes a change in the thickness in a length direction or a width direction of the electrode plate during the compression processing. When the thickness exceeds a range to be controlled, it is necessary to stop the line and manually reset the press conditions to adjust the thickness within the control range, and it is necessary to remove the thickness portion that cannot be applied to the product, so that a decrease in facility operation rate and a decrease in yield occur.

In recent years, secondary batteries have been increasingly required to be small, lightweight, and have a high capacity, or have a high capacity at the same manufacturing cost. In the battery design, the length of the electrode is determined such that both a cylindrical shape and a rectangular shape are accommodated in a battery case. Even with the same electrode length, the winding diameter when the electrode is wound increases as the thickness increases. Therefore, the length of the electrode is determined in consideration of a range of thickness variations that occur in manufacturing. That is, if thickness accuracy can be increased, the length of the electrode can be increased, so that a battery having a higher capacity can be designed.

In order to solve the above problems, a roll press device according to an aspect of the present disclosure includes: a first pressure roller and a second pressure roller structured to roll an electrode plate of a secondary battery to be continuously conveyed by sandwiching the electrode plate; a first main bearing and a second main bearing provided on one side and the other side of a rotation shaft of the first pressure roller, respectively, and structured to rotatably support the rotation shaft; a third main bearing and a fourth main bearing provided on one side and the other side of a rotation shaft of the second pressure roller, respectively, and structured to rotatably support the rotation shaft; a first bend bearing and a second bend bearing provided on one side and the other side of the rotation shaft of the first pressure roller, respectively, and structured to rotatably support the rotation shaft; a third bend bearing and a fourth bend bearing provided on one side and the other side of the rotation shaft of the second pressure roller, respectively, and structured to rotatably support the rotation shaft; a first compression mechanism capable of applying a load to at least one of the first main bearing and the third main bearing in a direction in which the first pressure roller and the second pressure roller approach each other; a second compression mechanism capable of applying a load to at least one of the second main bearing and the fourth main bearing in a direction in which the first pressure roller and the second pressure roller approach each other; a first bend mechanism capable of applying a load to at least one of the first bend bearing and the third bend bearing in a direction in which the first pressure roller and the second pressure roller are separated from each other; a second bend mechanism capable of applying a load to at least one of the second bend bearing and the fourth bend bearing in a direction in which the first pressure roller and the second pressure roller are separated from each other; a thickness meter provided on the exit side of the first pressure roller and the second pressure roller and structured to detect a thickness of the electrode plate of the secondary battery at three or more points in a width direction of the electrode plate; a calculator structured to calculate setting values of the first compression mechanism, the second compression mechanism, the first bend mechanism, and the second bend mechanism on the basis of thickness measurement values at the three or more points based on detection values of the thickness meter and a thickness target value; and a controller structured to control loads of the first compression mechanism, the second compression mechanism, the first bend mechanism, and the second bend mechanism on the basis of the setting values calculated by the calculator. The calculator calculates three feature amounts of a first deviation between the thickness target value and a thickness measurement value of a point closest to the first compression mechanism among the three or more points, a second deviation between the thickness target value and a thickness measurement value of a point closest to the second compression mechanism among the three or more points, and a secondary component of a thickness profile of the electrode plate, and adaptively changes the setting values of the first compression mechanism, the second compression mechanism, the first bend mechanism, and the second bend mechanism on the basis of the three feature amounts.

According to the present disclosure, it is possible to realize high accuracy of thickness control of a roll press device.

DESCRIPTION OF EMBODIMENTS

Figure 1:
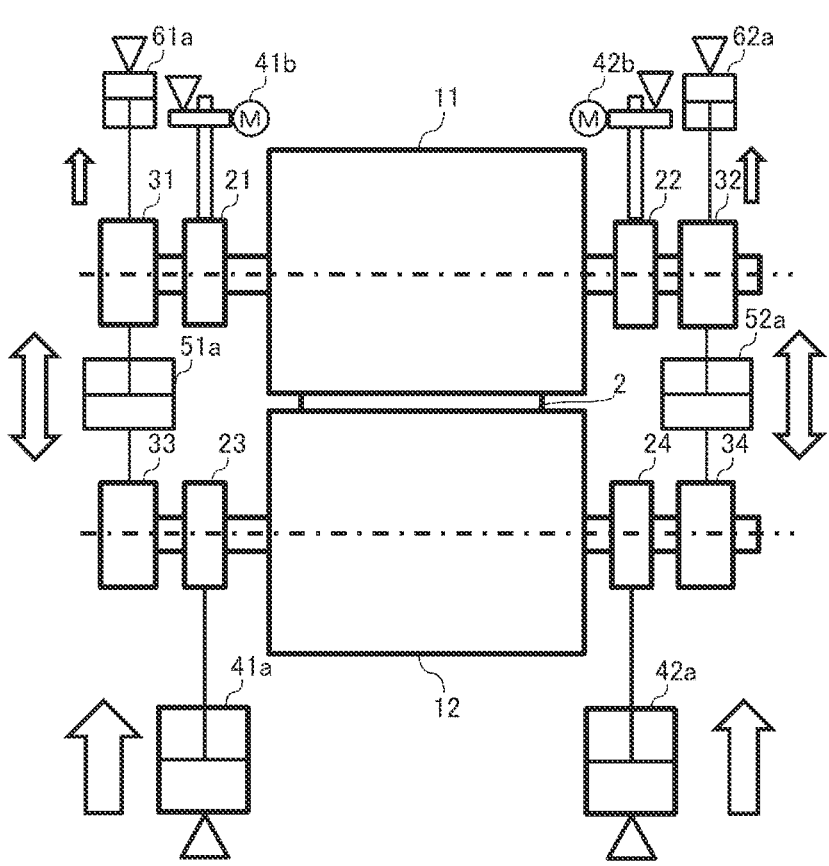
FIG. 1 is a schematic front view of a roll press device according to a first embodiment.

FIG. 1 is a schematic front view of a roll press device according to a first embodiment. A first pressure roller 11 and a second pressure roller 12 are a pair of upper and lower roll bites, and are installed to face each other in a contactable and separable manner. The pair of first pressure roller 11 and second pressure roller 12 rolls an electrode plate 2 by sandwiching the electrode plate 2 of a secondary battery to be continuously conveyed. The electrode plate 2 of the secondary battery passed through the roll press device is a sheet-shaped electrode material obtained by applying a slurry containing an active material to a metal foil and drying it. For example, a positive electrode plate of a lithium ion secondary battery is produced by applying a slurry containing a positive electrode active material such as lithium cobalt oxide or lithium iron phosphate on an aluminum foil. In addition, a negative electrode plate of the lithium ion secondary battery is produced by applying a slurry containing a negative electrode active material such as graphite on a copper foil. The thickness of the applied active material accounts for most of the thickness of the electrode plate 2 passed through the roll press device.

A first main bearing 21 and a second main bearing 22 are provided on one side and the other side of a rotation shaft of the first pressure roller 11, respectively, and rotatably support the rotation shaft. A third main bearing 23 and a fourth main bearing 24 are provided on one side and the other side of a rotation shaft of the second pressure roller 12, respectively, and rotatably support the rotation shaft.

A first bend bearing 31 and a second bend bearing 32 are provided on one side and the other side of the rotation shaft of the first pressure roller 11, respectively, and rotatably support the rotation shaft. A third bend bearing 33 and a fourth bend bearing 34 are provided on one side and the other side of the rotation shaft of the second pressure roller 12, respectively, and rotatably support the rotation shaft.

In the example illustrated in FIG. 1, each of the first main bearing 21 to the fourth main bearing 24 and the first bend bearing 31 to the fourth bend bearing 34 is formed of a bearing box incorporating a bearing that rotatably supports the rotation shaft of the roller.

A first compression mechanism 41 is a mechanism capable of compressing the electrode plate 2 by applying a load to at least one of the first main bearing 21 or the third main bearing 23 in a direction in which the first pressure roller 11 and the second pressure roller 12 approach each other. A second compression mechanism 42 is a mechanism capable of compressing the electrode plate 2 by applying a load to at least one of the second main bearing 22 or the fourth main bearing 24 in a direction in which the first pressure roller 11 and the second pressure roller 12 approach each other.

In the first embodiment, as the first compression mechanism 41, a first press cylinder 41*a* capable of applying a load to the third main bearing 23 and a first electric screw 41*b* capable of applying a load to the first main bearing 21 are provided. As the second compression mechanism 42, a second press cylinder 42*a* capable of applying a load to the fourth main bearing 24 and a second electric screw 42*b* capable of applying a load to the second main bearing 22 are provided. For pressure control of the first press cylinder 41*a* and the second press cylinder 42*a*, for example, a hydraulic servo valve or a pressure reducing valve can be used. A servomotor is used for position control of the first electric screw 41*b* and the second electric screw 42*b*. A pressure reduction amount of each of the first electric screw 41*b* and the second electric screw 42*b* is controlled by each servomotor, and the loads applied to the first main bearing 21 and the second main bearing 22 by the first electric screw 41*b* and the second electric screw 42*b* are controlled.

A first bend mechanism 51 (in the first embodiment, a first bend cylinder 51*a*) is a mechanism that is provided between the first bend bearing 31 and the third bend bearing 33, and can correct the deflection of the roller by applying a load in a direction in which the first pressure roller 11 and the second pressure roller 12 are separated from each other. A second bend mechanism 52 (in the first embodiment, a second bend cylinder 52*a*) is a mechanism that is provided between the second bend bearing 32 and the fourth bend bearing 34, and can correct the deflection of the roller by applying a load in a direction in which the first pressure roller 11 and the second pressure roller 12 are separated from each other.

A roll gap between the first pressure roller 11 and the second pressure roller 12 is controlled by changing the pressure of the first compression mechanism 41 and/or the second compression mechanism 42 by a press pressure controller 817*a* (refer to FIG. 5) to be described later. The roll deflection also changes with the change of the roll gap. A roll deflection amount can be corrected by changing the pressure of the first bend mechanism 51 and/or the second bend mechanism 52 by a bend pressure controller 818*a* (refer to FIG. 5) to be described later. At that time, the roll gap also changes and acts in a reverse manner to the pressure change by the first compression mechanism 41 and/or the second compression mechanism 42.

A first preload mechanism 61 (in the example illustrated in FIG. 1, a first preload cylinder 61*a*) is a mechanism that applies a constant load to the first bend bearing 31 in a direction in which the first pressure roller 11 and the second pressure roller 12 are separated from each other. A second preload mechanism 62 (in the example illustrated in FIG. 1, a second preload cylinder 62*a*) is a mechanism that applies a constant load to the second bend bearing 32 in a direction in which the first pressure roller 11 and the second pressure roller 12 are separated from each other. The pressures of the first preload cylinder 61*a* and the second preload cylinder 62*a* are fixed and are always set to the same pressure.

In the example illustrated in FIG. 1, the first preload mechanism 61 and the second preload mechanism 62 apply a preload load equal to or more than the weight of the first pressure roller 11 to the first bend bearing 31 and the second bend bearing 32. As a result, the first pressure roller 11 is moderately pressed (pulled) upward to reduce an influence of rattling of the roll press device. Note that the first preload mechanism 61 and the second preload mechanism 62 can be omitted.

Figure 2:
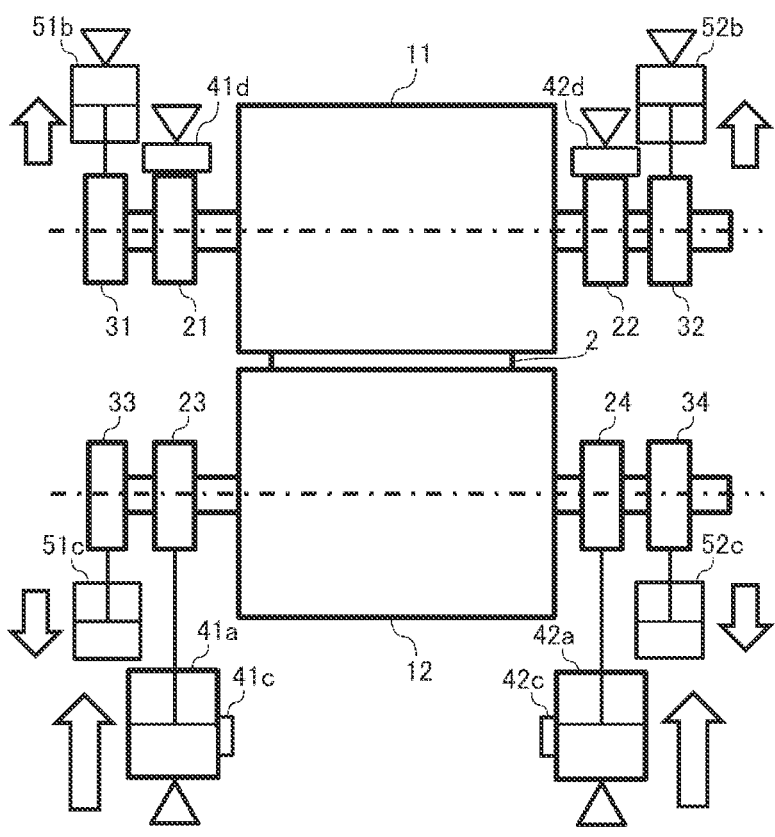
FIG. 2 is a schematic front view of a roll press device according to a second embodiment.

FIG. 2 is a schematic front view of a roll press device according to a second embodiment. Hereinafter, differences from the configuration of the first embodiment will be described. In the first embodiment, the first bend mechanism 51 and the second bend mechanism 52 of a type in which the first bend cylinder 51*a* and the second bend cylinder 52*a* are provided between the first bend bearing 31 and the second bend bearing 32 on the upper side and the third bend bearing 33 and the fourth bend bearing 34 on the lower side, and a load is applied in a direction in which the first pressure roller 11 and the second pressure roller 12 are separated from each other are adopted.

In the second embodiment, as the first bend mechanism 51 and the second bend mechanism 52, a third bend cylinder 51*b* is provided outside the first bend bearing 31, a fourth bend cylinder 52*b* is provided outside the second bend bearing 32, a fifth bend cylinder 51*c* is provided outside the third bend bearing 33, and a sixth bend cylinder 52*c* is provided outside the fourth bend bearing 34. In the second embodiment, a type in which a load is applied in a direction in which the first pressure roller 11 and the second pressure roller 12 are separated from each other by the third bend cylinder 51*b*, the fourth bend cylinder 52*b*, the fifth bend cylinder 51*c*, and the sixth bend cylinder 52*c* is adopted. In the second embodiment, the first preload mechanism 61 and the second preload mechanism 62 are not provided.

In the second embodiment, the first compression mechanism 41 includes a first press cylinder 41*a*, a first magnescale 41*c*, and a first load cell 41*d*. In the second embodiment, a hydraulic servo valve is used for pressure control of the first press cylinder 41*a*. The first magnescale 41*c* detects a position of the first press cylinder 41*a*. In the second embodiment, a load due to the weight of the first pressure roller 11 is applied to the first main bearing 21. The first load cell 41*d* is a compression type load cell, and detects a load applied to the first main bearing 21. Since a configuration of the second compression mechanism 42 is the same as that of the first compression mechanism 41, the description thereof will be omitted. In the second embodiment, the first electric screw 41*b* and the second electric screw 42*b* are not provided.

Figure 3:
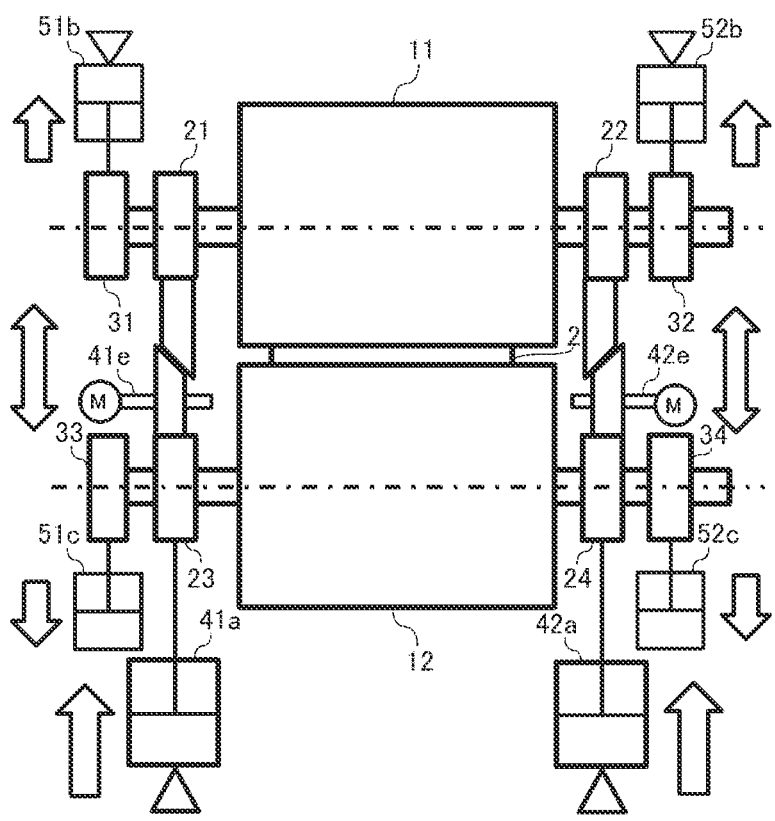
FIG. 3 is a schematic front view of a roll press device according to a third embodiment.

FIG. 3 is a schematic front view of a roll press device according to a third embodiment. Hereinafter, differences from the configuration of the first embodiment will be described. A first bend mechanism 51 and a second bend mechanism 52 according to the third embodiment adopt the same types as those of the first bend mechanism 51 and the second bend mechanism 52 according to the second embodiment.

The first compression mechanism 41 and the second compression mechanism 42 according to the third embodiment are provided with a first electric cotter 41*e* and a second electric cotter 42*e* instead of the first electric screw

41*b* and the second electric screw 42*b* according to the first embodiment. The first load cell 41*d* and the second load cell 42*d* are not provided. In general, the roll press device according to the third embodiment can be manufactured at a lower cost than the roll press devices according to the first and second embodiments.

The first electric cotter 41*e* is provided between the first main bearing 21 and the third main bearing 23. The first electric cotter 41*e* includes an upper cotter fixed to the first main bearing 21 and a lower cotter fixed to the third main bearing 23. A bottom surface of the upper cotter and a top surface of the lower cotter are tapered surfaces, and the tapered surfaces are disposed to face each other. The lower cotter is provided with a linear servo motor for sliding the lower cotter in a left-right direction (a direction of the tapered surface). The lower cotter is slid in the left-right direction, so that a height of the first electric cotter 41*e* can be adjusted. In the example illustrated in FIG. 3, when the lower cotter slides leftward, the height of the first electric cotter 41*e* decreases, and when the lower cotter slides rightward, the height of the first electric cotter 41*e* increases. That is, as the lower cotter slides leftward, a load in a direction in which the first pressure roller 11 and the second pressure roller 12 approach each other increases.

The second electric cotter 42*e* is provided between the second main bearing 22 and the fourth main bearing 24. The second electric cotter 42*e* includes an upper cotter fixed to the second main bearing 22 and a lower cotter fixed to the fourth main bearing 24. Since a configuration of the second electric cotter 42*e* is the same as that of the first electric cotter 41*e*, the description thereof will be omitted.

Figure 4:
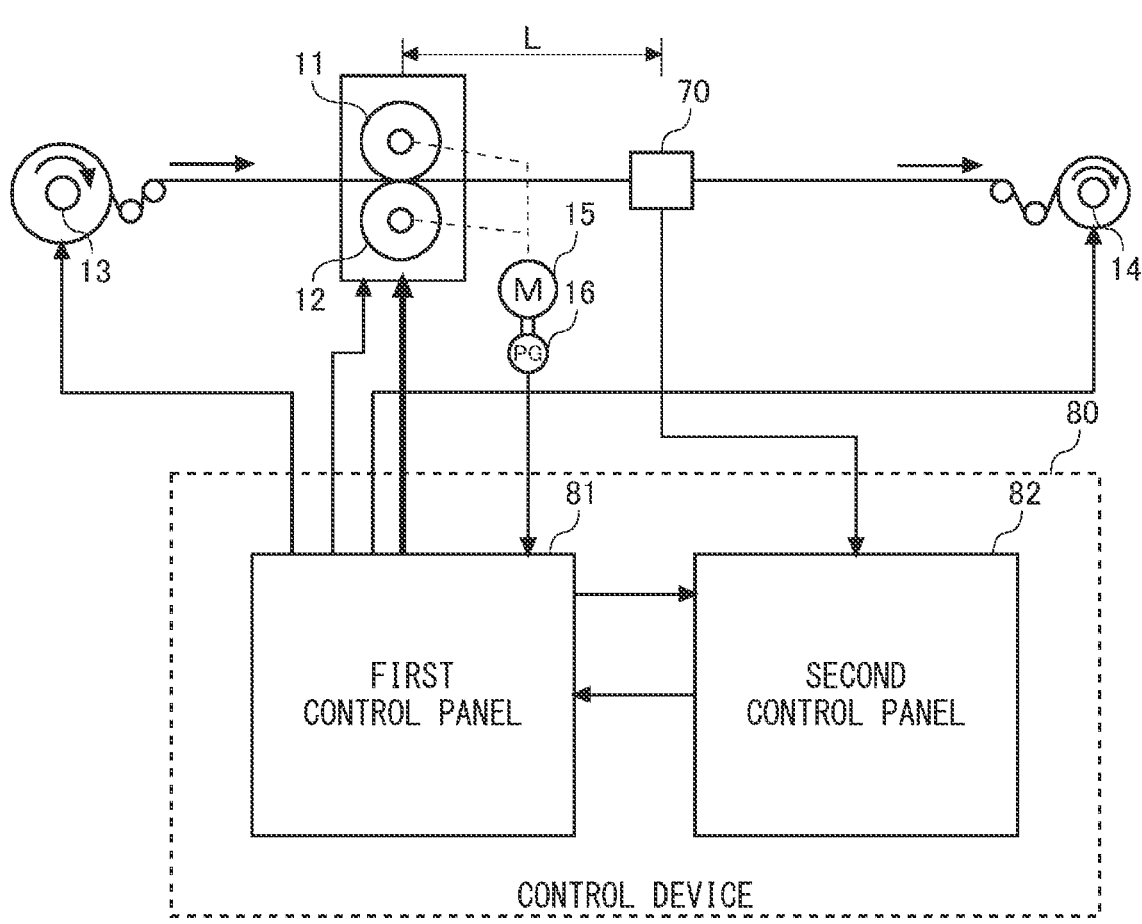
FIG. 4 is a schematic side view of the roll press devices according to the first to third embodiments.

FIG. 4 is a schematic side view of the roll press device 1 according to each of the first to third embodiments. An unwinder 13 is installed on the entry side of the pair of first pressure roller 11 and second pressure roller 12, and a winder 14 is installed on the exit side. The unwinder 13 unwinds the sheet-like electrode plate 2 wound in a coil shape toward the pair of first pressure roller 11 and second pressure roller 12. The winder 14 winds the electrode plate 2 compressed by the pair of first pressure roller 11 and second pressure roller 12 into a coil shape.

A motor 15 is a motor that drives the first pressure roller 11 and the second pressure roller 12. A pulse generator 16 is attached to the driving motor 15 and detects a rotation speed of the motor 15.

A thickness meter 70 is provided on the exit side of the pair of first pressure roller 11 and second pressure roller 12, and detects the thickness of the electrode plate 2 at each of three points of a first point, a second point, and a third point arranged in a width direction of the electrode plate 2. The first point is set at an end portion of the electrode plate 2 on the side where the first compression mechanism 41 is provided. The second point is set at a center portion of the electrode plate 2. The third point is set at an end portion of the electrode plate 2 on the side where the second compression mechanism 42 is provided.

In the general roll press device 1, a screen operated by an operator is installed on the side (the side of the second compression mechanism 42 in the first to third embodiments) opposite to the side (the side of the first compression mechanism 41 in the first to third embodiments) where the motor 15 is installed. Therefore, hereinafter, in the first to third embodiments, the first point is referred to as the driving side, the second point is referred to as the center portion, and the third point is referred to as the operation side. That is, the thickness meter 70 detects the thickness of each of the driving side, the center portion, and the operation side of the electrode plate 2 after the compression processing.

The thickness meter 70 may extract the thickness of each of the driving side, the center portion, and the operation side by continuously detecting the thickness of the electrode plate 2 by scanning one thickness detection sensor in the width direction of the electrode plate 2.

In the thickness meter 70, three thickness detection sensors may be fixed and installed on the driving side, the center portion, and the operation side, respectively, and the thicknesses of the driving side, the center portion, and the operation side may be detected by the three thickness detection sensors, respectively.

As a detection method of the thickness meter 70, a method for detecting distances to both surfaces of the electrode plate 2 using a laser sensor or an optical sensor and detecting a thickness from a positional relation thereof may be used. In addition, a method may be used in which a change in eddy current is detected by a magnetic sensor to detect a distance to an outer diameter surface of the electrode plate 2, a distance to a surface of the electrode plate 2 on a guide roll is detected by a laser sensor or an optical sensor, and a thickness is detected from a positional relation between the guide roll and the surface of the electrode plate 2. Note that the distance to the surface of the electrode plate 2 may be detected using a white confocal sensor.

A control device 80 is a device for controlling the entire roll press device 1, and includes a first control panel 81 and a second control panel 82 in the example illustrated in FIG. 4. The first control panel 81 is a control panel of a press system, and the second control panel 82 is a control panel of a thickness system. A rotation pulse generated by the pulse generator 16 is input to the first control panel 81. A thickness detection value detected by the thickness meter 70 is input to the second control panel 82. The configuration described using FIG. 4 is common to the first to third embodiments.

Figure 5:
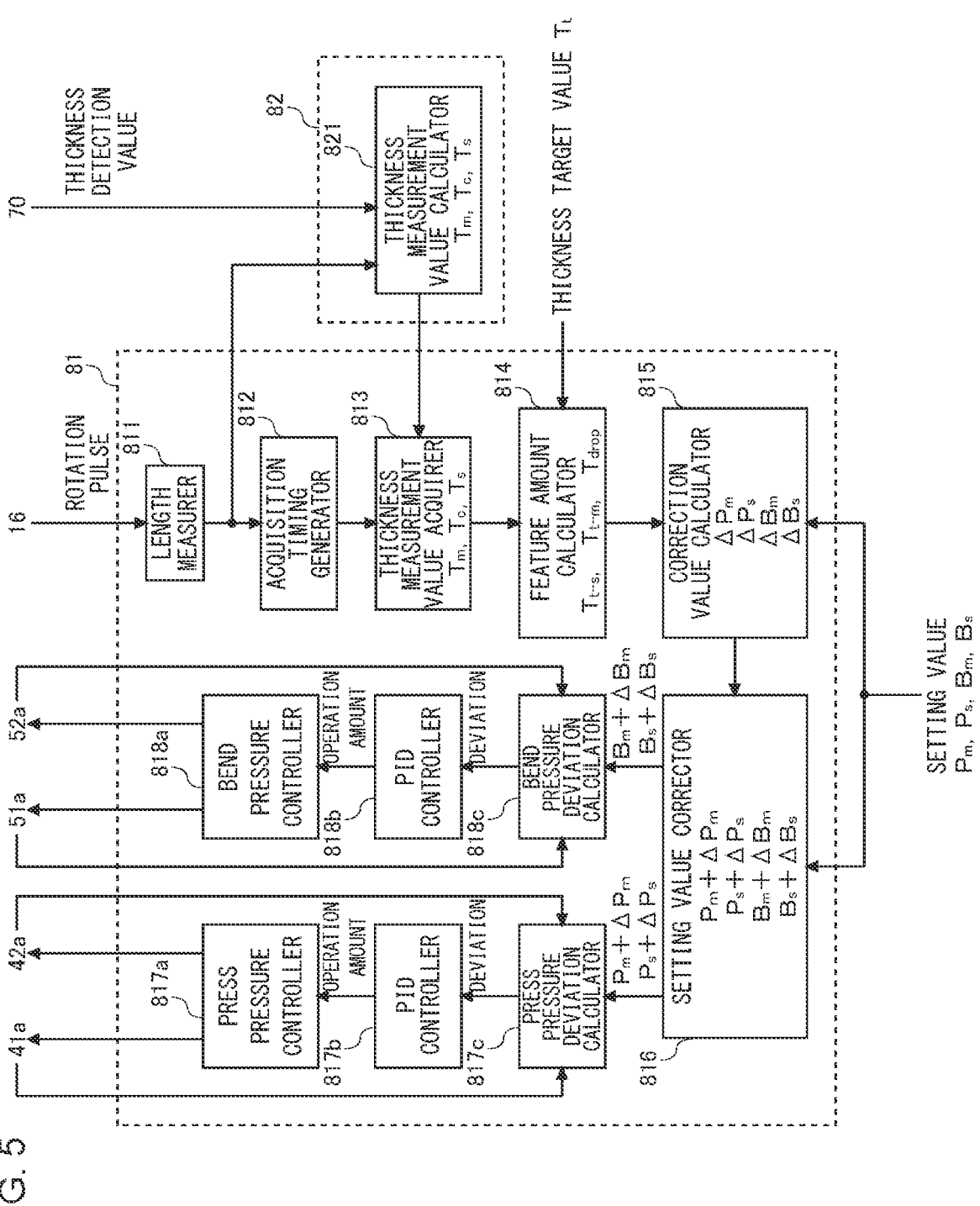
FIG. 5 is a diagram illustrating a feedback control example 1 using a first control panel and a second control panel.

FIG. 5 is a diagram illustrating a feedback control example 1 using the first control panel 81 and the second control panel 82. The feedback control example 1 is control used in the roll press device according to the first embodiment illustrated in FIG. 1. In the feedback control example 1, the first press cylinder 41a and the second press cylinder 42a are used as the compression mechanism. The first bend cylinder 51a and the second bend cylinder 52a are used as the bend mechanism. The first control panel 81 includes a programmable logic controller (PLC), a personal computer (PC), a human machine interface (HMI), an actuator controller, and the like. The second control panel includes a PLC, a PC, a sensor controller, and the like.

A program operating in the PLC is generated by a dedicated application in the PC and downloaded to the PLC. The PLC receives product information of the electrode plate 2 from a manufacturing execution system (MES). Various setting values input to the operator via the HMI are input to the PLC. In the feedback control example 1, the setting values include a thickness target value of the electrode plate 2, pressure setting values of the first press cylinder 41a and the second press cylinder 42a, and pressure setting values of the first bend cylinder 51a and the second bend cylinder 52a. The HMI receives an input from the operator, displays a driving situation, an alarm, and the like, and outputs a sound.

FIG. 5 illustrates functional blocks realized by the first control panel 81 and the second control panel 82 related to the feedback control example 1. The first control panel 81 includes a length measurer 811, an acquisition timing generator 812, a thickness measurement value acquirer 813, a feature amount calculator 814, a correction value calculator

815, a setting value corrector 816, a press pressure controller 817a, a PID controller 817b, a press pressure deviation calculator 817c, a bend pressure controller 818a, a PID controller 818b, and a bend pressure deviation calculator 818c. The second control panel 82 includes a thickness measurement value calculator 821.

A rotation pulse is input from the pulse generator 16 to the length measurer 811. The length measurer 811 estimates the rotation speeds of the first pressure roller 11 and the second pressure roller 12 on the basis of the input rotation pulse, and estimates the speed of the electrode plate 2 passing between the first pressure roller 11 and the second pressure roller 12. The length measurer 811 measures a length (distance) of the electrode plate 2 traveling per unit time, on the basis of the estimated speed of the electrode plate 2. The length measurer 811 supplies the measured length of the electrode plate 2 to the acquisition timing generator 812 and the thickness measurement value calculator 821.

The thickness measurement value calculator 821 receives the respective thickness detection values of the driving side, the center portion, and the operation side from the thickness meter 70. In addition, the length of the electrode plate 2 is input from the length measurer 811.

When three thickness detection sensors are fixed and the thickness is detected in the thickness meter 70, the thickness measurement value calculator 821 averages each of the three thickness detection values in the length direction (traveling direction) of the electrode plate 2 and performs filtering in order to remove a high-cycle thickness variation that does not need to be controlled. It is desirable to calculate an average value of 5 mm or more in the traveling direction in order to remove a steep change in the traveling direction due to application pump pulsation or the like in an application step.

For example, in a case where the thickness detection value is input every 1 mm pitch, the thickness measurement value calculator 821 calculates a moving average value of five points in the traveling direction and uses the calculated value as the measurement value. In addition, an average value of three points excluding the two most deviating points among the five points detected in the traveling direction may be calculated and used as the measurement value. When the moving average value is calculated, the thickness measurement value calculator 821 uses the length of the electrode plate 2 input from the length measurer 811 as a synchronization signal. Note that a detection value corresponding to a non-coated portion corresponding to a slit in the width direction of the electrode plate 2 or a portion coated only on one side is removed.

In the case where the thickness meter 70 scans one thickness detection sensor in the width direction of the electrode plate 2 to detect the thickness, the thickness measurement value calculator 821 may calculate an average value of detection values in a width range of each of the driving side, the center portion, and the operation side set in advance and use the average value as the measurement value. Furthermore, the measurement values may be averaged in the traveling direction as described above to obtain a final measurement value.

The thickness measurement value calculator 821 supplies the calculated driving-side thickness measurement value $T_m$, center thickness measurement value $T_c$, and operation-side thickness measurement value $T_s$ to the thickness measurement value acquirer 813.

The acquisition timing generator 812 generates timing at which the thickness measurement value acquirer 813 acquires the driving-side thickness measurement value $T_m$, the center thickness measurement value $T_c$, and the operation-side thickness measurement value $T_s$ supplied from the thickness measurement value calculator 821, and supplies the generated timing to the thickness measurement value acquirer 813.

There is a distance $L_t$ (pass line length $L_t$) between a press position by the first pressure roller 11 and the second pressure roller 12 and the thickness meter 70. Therefore, a time lag occurs until the thickness meter 70 detects the thickness change caused by the pressure change by the first pressure roller 11 and the second pressure roller 12. Further, a time lag $t_d$ also occurs until the actual pressure change of the compression mechanism and/or the bend mechanism is completed after the pressure setting value of the compression mechanism and/or the bend mechanism is changed.

Among the press cylinder controlled by the hydraulic servo valve, the press cylinder controlled by the pressure reducing valve, the electric screw, and the electric cotter, the press cylinder controlled by the hydraulic servo valve has the highest responsiveness, and the control system time lag $t_d$ is the smallest when the press cylinder controlled by the hydraulic servo valve is used.

The pass line length $L_t$ and the control system time lag $t_d$ are actually measured in advance, and the actually measured values are set as fixed values in the acquisition timing generator 812. The acquisition timing generator 812 uses a length parameter L to be compared with the pass line length $L_t$ and a time parameter t to be compared with the control system time lag $t_d$. The acquisition timing generator 812 increments the length parameter L on the basis of the length of the electrode plate 2 supplied from the length measurer 811, and increments the control system time lag $t_d$ on the basis of a clock supplied from a clock.

When the pressure setting value of at least one of the first press cylinder 41a, the second press cylinder 42a, the first bend cylinder 51a, or the second bend cylinder 52a is changed by the setting value corrector 816, the acquisition timing generator 812 resets the length parameter L and the time parameter t to zero. When the length parameter L exceeds the pass line length $L_t$ and the time parameter t exceeds the control system time lag $t_d$, the acquisition timing generator 812 supplies the acquisition timing to the thickness measurement value acquirer 813.

A state in which the length parameter L exceeds the pass line length $L_t$ and the time parameter t exceeds the control system time lag $t_d$ is a state in which a change in the thickness of the electrode plate 2 due to a change in the pressure setting value of at least one of the first press cylinder 41a, the second press cylinder 42a, the first bend cylinder 51a, or the second bend cylinder 52a is reflected in the detection value of the thickness meter 70.

On the other hand, a state in which the length parameter L does not exceed the pass line length $L_t$ or a state in which the time parameter t does not exceed the control system time lag $t_d$ is a state in which a change in the thickness of the electrode plate 2 due to a change in the pressure setting value of at least one of the first press cylinder 41a, the second press cylinder 42a, the first bend cylinder 51a, or the second bend cylinder 52a is not yet reflected in the detection value of the thickness meter 70. This state is a state in which an influence of the change in the pressure setting value on the thickness of the electrode plate 2 has not been able to be confirmed.

Therefore, it is necessary to wait until the length parameter L exceeds the pass line length $L_t$ and the time parameter t exceeds the control system time lag $t_d$, and a next change of a pressure setting value is suspended until this state is reached. As a result, useless or excessive changes of the pressure setting values of the first press cylinder 41a, the second press cylinder 42a, the first bend cylinder 51a, and the second bend cylinder 52a are avoided, and the pressure setting values can be efficiently adjusted.

The thickness measurement value acquirer 813 acquires the driving-side thickness measurement value $T_m$, the center thickness measurement value $T_c$, and the operation-side thickness measurement value $T_s$ supplied from the thickness measurement value calculator 821 at the timing supplied from the acquisition timing generator 812, and supplies them to the feature amount calculator 814.

The driving-side thickness measurement value $T_m$, the center thickness measurement value $T_c$, and the operation-side thickness measurement value $T_s$ are input from the thickness measurement value acquirer 813 to the feature amount calculator 814. Further, a thickness target value $T_t$ set by the operator is input to the feature amount calculator 814.

On the basis of the driving-side thickness measurement value $T_m$, the center thickness measurement value $T_c$, the operation-side thickness measurement value $T_s$, and the thickness target value $T_t$, the feature amount calculator 814 calculates three deviation feature amounts defined by the following (Formula 1) to (Formula 3) as a thickness amount to be controlled. A first feature amount $T_{t-m}$ is defined by a difference between the thickness target value $T_t$ and the driving-side thickness measurement value $T_m$. A second feature amount $T_{t-s}$ is defined by a difference between the thickness target value $T_t$ and the operation-side thickness measurement value $T_s$. A third feature amount $T_{drop}$ is defined by a difference between the center thickness measurement value $T_c$ and an average value of the driving-side thickness measurement value $T_m$ and the operation-side thickness measurement value $T_s$.

$$T_{t-m} = T_t - T_m \qquad \text{(Formula 1)}$$

$$T_{t-s} = T_t - T_s \qquad \text{(Formula 2)}$$

$$T_{drop} = T_c - T_{ms,ave} = T_c - (T_m + T_s)/2 \qquad \text{(Formula 3)}$$

When the first feature amount $T_{t-m} = 0$, the second feature amount $T_{t-s} = 0$, and the third feature amount $T_{drop} = 0$ are set, the driving-side thickness measurement value $T_m$ = the center thickness measurement value $T_c$ = the operation-side thickness measurement value $T_s$ = the thickness target value $T_t$ is obtained. The third feature amount $T_{drop}$ represents a secondary component (parabolic shape convex upward when a numerical value is large) of a thickness profile, and changes depending on the magnitude of the roll deflection and the direction of the roll deflection.

The feature amount calculator 814 supplies the calculated first feature amount $T_{t-m}$, second feature amount $T_{t-s}$, and third feature amount $T_{drop}$ to the correction value calculator 815.

According to experiments by the present inventors, it has been found that there are relations defined by the following (Formula 4) to (Formula 6) between the first feature amount $T_{t-m}$, the second feature amount $T_{t-s}$, and the third feature amount $T_{drop}$ and the load.

$$T_{t-m} \propto (\text{driving-side load}) \qquad \text{(Formula 4)}$$

$$T_{t-s} \propto (\text{operation-side load}) \qquad \text{(Formula 5)}$$

$$T_{drop} \propto A \times (\text{total press load}) - B \times (\text{total bend load}) - C \times (\text{total preload load}) \qquad \text{(Formula 6)}$$

Here, the total press load is the sum of the driving-side press load and the operation-side press load, the total bend load is the sum of the driving-side bend load and the operation-side bend load, and the total preload load is the sum of the driving-side preload load and the operation-side preload load. The driving-side load is a driving-side load generated by the driving-side press cylinder, the driving-side bend cylinder, and the driving-side preload cylinder. The operation-side load is an operation-side load generated by the operation-side press cylinder, the operation-side bend cylinder, and the operation-side preload cylinder.

The press cylinder load acts in a direction of applying a pressure to a material to be rolled, and the bend load and the preload load act in a direction of reducing the pressure to the material to be rolled. The preload cylinder load is set to a fixed value at which a pressure that does not excessively generate the roll deflection and a press pressure that can reduce the rattling and vibration of a facility are secured. That is, the preload load is not changed in the thickness control. When the preload cylinder load is excessively large, it is difficult to control the roll deflection within a control range of the press pressure and the bend pressure. In a case of a facility in which the first preload cylinder 61a and the second preload cylinder 62a are not provided, the preload load is zero.

A, B, and C in the above (Formula 6) are positive constants, and indicate that an influence of the difference between the driving-side load and the operation-side load of each of the total press load, the total bend load, and the total preload load on the third feature amount $T_{drop}$ is different.

By measuring proportional constants of a left side and a right side of each of the above (Formula 4) to (Formula 6) in advance, when the total preload load is a constant value or when the preload mechanism is not provided, the total press load and the total bend load that cause the first feature amount $T_{t-m}$, the second feature amount $T_{t-s}$, and the third feature amount $T_{drop}$ to be zero at the same time can be uniquely obtained from the above (Formula 4) to (Formula 6).

In the feedback control example 1, each load is controlled by controlling the pressure of each cylinder. The load is calculated by cylinder diameter (constant)×cylinder pressure. From the above (Formula 4) to (Formula 6), relations of the following (Formula 7) to (Formula 15) hold between a driving-side press pressure $P_m$, an operation-side press pressure $P_s$, a driving-side bend pressure $B_m$, an operation-side bend pressure $B_s$, a driving-side preload pressure $R_m$, an operation-side preload pressure $R_s$, an average press pressure $P_{ave}=(P_m+P_3)/2$, an average bend pressure $B_{ave}=(B_m+B_s)/2$, and an average preload pressure $R_{ave}=(R_m+R_s)/2$ and the first feature amount $T_{t-m}$, the second feature amount $T_{t-s}$, and the third feature amount $T_{drop}$. Specifically, the following (Formula 7) to (Formula 9) are derived from the above (Formula 4), the following (Formula 10) to (Formula 12) are derived from the above (Formula 5), and the following (Formula 13) to (Formula 15) are derived from the above (Formula 6).

$$T_{t-n} \propto P_m \qquad \text{(Formula 7)}$$

$$T_{t-n} \propto -B_m \qquad \text{(Formula 8)}$$

$$T_{t-n} \propto -R_m \qquad \text{(Formula 9)}$$

$$T_{t-s} \propto P_s \qquad \text{(Formula 10)}$$

$$T_{t-s} \propto -B_s \qquad \text{(Formula 11)}$$

$$T_{t-s} \propto -R_s \qquad \text{(Formula 12)}$$

$$T_{drop} \propto P_{ave} \qquad \text{(Formula 13)}$$

$$T_{drop} \propto -B_{ave} \qquad \text{(Formula 14)}$$

$$T_{drop} \propto -R_{ave} \qquad \text{(Formula 15)}$$

The proportional constants of the above (Formula 7) and (Formula 8), the above (Formula 10) and (Formula 11), and the above (Formula 13) and (Formula 14) are measured in advance. In a case where a pressure difference between the driving-side bend pressure $B_m$ and the operation-side bend pressure $B_s$ is caused to be constant when the preload pressure is constant or when the preload mechanism is not provided, a driving-side press pressure correction value $\Delta P_m$ and an operation-side press pressure correction value $\Delta P_s$ of the driving-side press pressure $P_m$ and the operation-side press pressure $P_s$ at which the first feature amount $T_{t-m}$ and the second feature amount $T_{t-s}$ become zero at the same time are obtained from the correlations shown in the above (Formula 7) and (Formula 10).

From the correlation shown in the above (Formula 13), a change amount of the third feature amount $T_{drop}$ associated with the correction of the driving-side press pressure $P_m$ and the operation-side press pressure $P_s$ described above is obtained. A correction value $\Delta B_{ave}$ of the average bend pressure $B_{ave}$ for causing the third feature amount $T_{drop}$ to be zero is obtained on the basis of the correlation shown in the above (Formula 14) and the change amount of the third feature amount $T_{drop}$. Since the difference between the driving-side bend pressure $B_m$ and the operation-side bend pressure $B_s$ is constant, the driving-side bend pressure correction value $\Delta B_m$ and the operation-side bend pressure correction value $\Delta B_s$ of the driving-side bend pressure $B_m$ and the operation-side bend pressure $B_s$ are obtained.

The thickness over the entire width of the electrode plate 2 can be controlled to the target value $T_t$ by controlling the pressure of each cylinder such that the pressure of the first press cylinder 41a becomes a corrected driving-side press pressure setting value $P_m+\Delta P_m$, the pressure of the second press cylinder 42a becomes a corrected operation-side press pressure setting value $P_s+\Delta P_s$, the pressure of the first bend cylinder 51a becomes a corrected driving-side bend pressure setting value $B_m+\Delta B_m$, and the pressure of the second bend cylinder 52a becomes a corrected operation-side bend pressure setting value $B_s+\Delta B_s$.

The correction value calculator 815 is supplied with the first feature amount $T_{t-m}$, the second feature amount $T_{t-s}$, and the third feature amount $T_{drop}$ from the feature amount calculator 814. In addition, the driving-side press pressure setting value $P_m$, the operation-side press pressure setting value $P_s$, the driving-side bend pressure setting value $B_m$, and the operation-side bend pressure setting value $B_s$ input by the operator via the HMI are supplied. The values derived in advance are set to the driving-side press pressure setting value $P_m$, the operation-side press pressure setting value $P_s$, the driving-side bend pressure setting value $B_m$, and the operation-side bend pressure setting value $B_s$ such that all of the first feature amount $T_{t-m}$, the second feature amount $T_{t-s}$, and the third feature amount $T_{drop}$ become zero under the standard condition.

The correction value calculator 815 calculates the driving-side press pressure correction value $\Delta P_m$, the operation-side press pressure correction value $\Delta P_s$, the driving-side bend pressure correction value $\Delta B_m$, and the operation-side bend pressure correction value $\Delta B_s$, on the basis of the first feature amount $T_{t-m}$, the second feature amount $T_{t-s}$, the third feature amount $T_{drop}$, and the proportional constants of the above (Formula 7), (Formula 8), (Formula 10), (Formula 11), (Formula 13), and (Formula 14). The correction value calculator 815 supplies the calculated driving-side press pressure correction value $\Delta P_m$, operation-side press pressure correction value $\Delta P_s$, driving-side bend pressure correction value $\Delta B_m$, and operation-side bend pressure correction value $\Delta B_s$ to the setting value corrector 816.

The setting value corrector 816 is supplied with the driving-side press pressure correction value $\Delta P_m$, the operation-side press pressure correction value $\Delta P_s$, the driving-side bend pressure correction value $\Delta B_m$, and the operation-side bend pressure correction value $\Delta B_s$ from the correction value calculator 815. In addition, the driving-side press pressure setting value $P_m$, the operation-side press pressure setting value $P_s$, the driving-side bend pressure setting value $B_m$, and the operation-side bend pressure setting value $B_s$ input by the operator via the HMI are supplied.

The setting value corrector 816 adds the driving-side press pressure correction value $\Delta P_m$, the operation-side press pressure correction value $\Delta P_s$, the driving-side bend pressure correction value $\Delta B_m$, and the operation-side bend pressure correction value $\Delta B_s$ to the driving-side press pressure setting value $P_m$, the operation-side press pressure setting value $P_s$, the driving-side bend pressure setting value $B_m$, and the operation-side bend pressure setting value $B_s$, respectively, and calculates the corrected driving-side press pressure setting value $P_m+\Delta P_m$, the corrected operation-side press pressure setting value $P_s+\Delta P_s$, the corrected driving-side bend pressure setting value $B_m+\Delta B_m$, and the corrected operation-side bend pressure setting value $B_s+\Delta B_s$.

The setting value corrector 816 supplies the calculated corrected driving-side press pressure setting value $P_m+\Delta P_m$ and corrected operation-side press pressure setting value $P_s+\Delta P_s$ to the press pressure deviation calculator 817c, and supplies the corrected driving-side bend pressure setting value $B_m+\Delta B_m$ and the corrected operation-side bend pressure setting value $B_s+\Delta B_s$ to the bend pressure deviation calculator 818c.

The press pressure deviation calculator 817c calculates a deviation between the corrected driving-side press pressure setting value $P_m+\Delta P_m$ supplied from the setting value corrector 816 and the actually measured pressure value of the first press cylinder 41a and a deviation between the corrected operation-side press pressure setting value $P_s+\Delta P_s$ and the actually measured pressure value of the second press cylinder 42a. Each of the actually measured pressure value of the first press cylinder 41a and the actually measured pressure value of the second press cylinder 42a can be estimated according to, for example, a measurement value of a valve opening meter.

The press pressure deviation calculator 817c supplies the calculated pressure deviation of the first press cylinder 41a and the calculated pressure deviation of the second press cylinder 42a to the PID controller 817b. The PID controller 817b generates a pressure operation amount of the first press cylinder 41a and a pressure operation amount of the second press cylinder 42a, on the basis of the pressure deviation of the first press cylinder 41a and the pressure deviation of the second press cylinder 42a.

Note that, instead of PID compensation, P compensation, PI compensation, or PD compensation may be used. In the P compensation, a proportional term (stationary deviation) can be controlled, in the I compensation, an integral term can be controlled, and in the D compensation, a differential term can be controlled.

The PID controller 817b supplies the generated pressure operation amount of the first press cylinder 41a and the generated pressure operation amount of the second press cylinder 42a to the press pressure controller 817a. The press pressure controller 817a includes an actuator and drives each of the first press cylinder 41a and the second press cylinder 42a on the basis of the pressure operation amount of the first press cylinder 41a and the pressure operation amount of the second press cylinder 42a.

The bend pressure deviation calculator 818c calculates a deviation between the corrected driving-side bend pressure setting value $B_m+\Delta B_m$ supplied from the setting value corrector 816 and the actually measured pressure value of the first bend cylinder 51a and a deviation between the corrected operation-side bend pressure setting value $B_s+\Delta B_s$ and the actually measured pressure value of the second bend cylinder 52a.

The bend pressure deviation calculator 818c supplies the calculated pressure deviation of the first bend cylinder 51a and the calculated pressure deviation of the second bend cylinder 52a to the PID controller 818b. The PID controller 818b generates the pressure operation amount of the first bend cylinder 51a and the pressure operation amount of the second bend cylinder 52a, on the basis of the pressure deviation of the first bend cylinder 51a and the pressure deviation of the second bend cylinder 52a.

The PID controller 818b supplies the generated pressure operation amount of the first bend cylinder 51a and the generated pressure operation amount of the second bend cylinder 52a to the bend pressure controller 818a. The bend pressure controller 818a includes an actuator and drives each of the first bend cylinder 51a and the second bend cylinder 52a on the basis of the pressure operation amount of the first bend cylinder 51a and the pressure operation amount of the second bend cylinder 52a.

As described above, in the feedback control example 1, the feedback control is performed such that the pressure of the press cylinder maintains the setting value. The operation target is the pressure of the press cylinder. In addition, the feedback control is performed such that the pressure of the bend cylinder maintains the setting value. The operation target is the pressure of the bend cylinder. The thickness of the electrode plate 2 is controlled to the target value by adding the correction value calculated from the thickness measurement value to the setting value of the press cylinder pressure and the setting value of the bend cylinder pressure.

Figure 6:
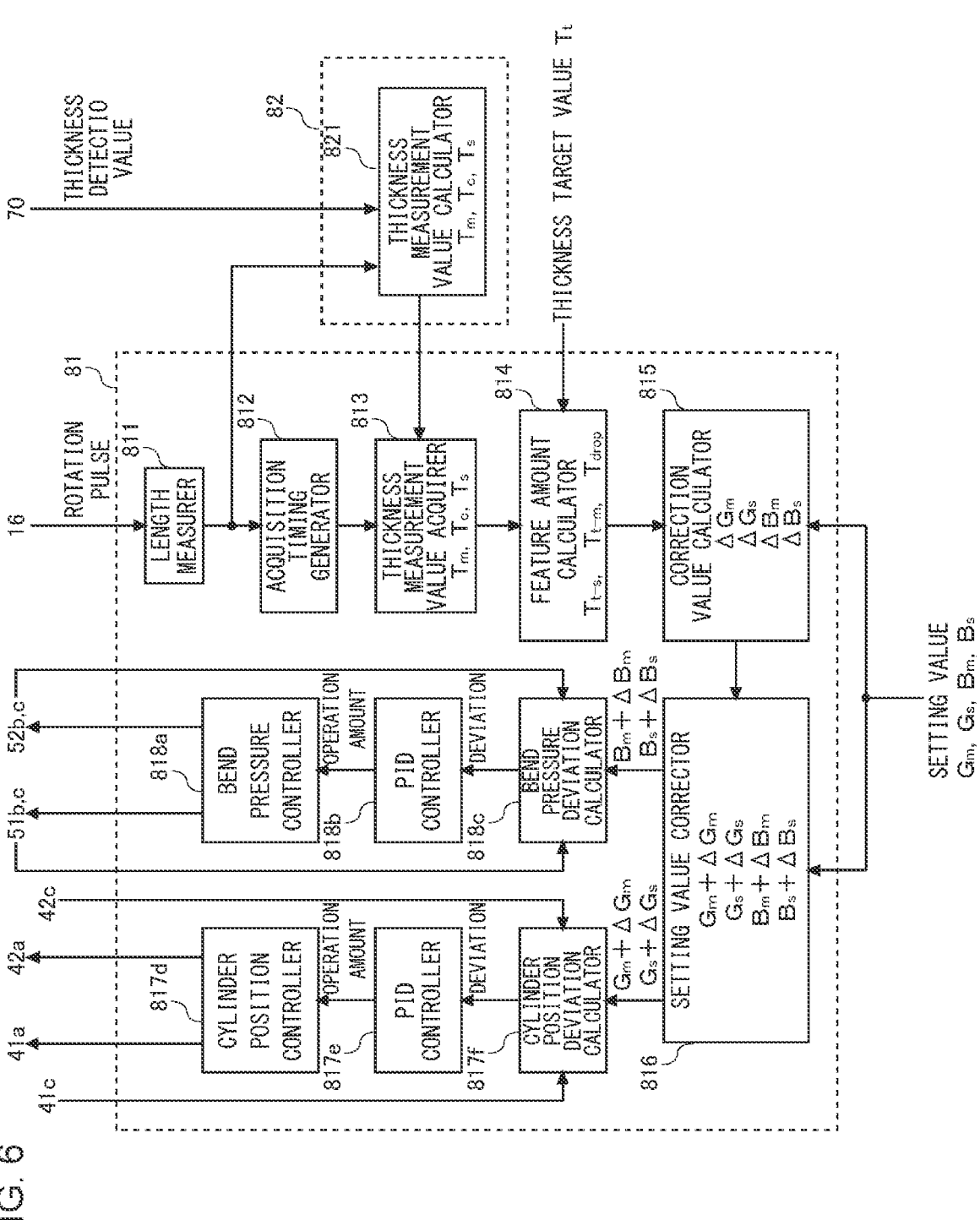
FIG. 6 is a diagram illustrating a feedback control example 2 using the first control panel and the second control panel.

FIG. 6 is a diagram illustrating a feedback control example 2 using the first control panel 81 and the second control panel 82. The feedback control example 2 is control used in the roll press device according to the second embodiment illustrated in FIG. 2. In the feedback control example 2, the first press cylinder 41a and the second press cylinder 42a are used as the compression mechanism. As the bend mechanism, at least one of the third bend cylinder 51b or the fifth bend cylinder 51c and at least one of the fourth bend cylinder 52b or the sixth bend cylinder 52c are used. Hereinafter, differences from the feedback control example 1 illustrated in FIG. 5 will be described. In the feedback control example 2, instead of the press pressure controller 817a, the PID controller 817b, and the press pressure deviation calculator 817c, a cylinder position controller 817d, a PID controller 817e, and a cylinder position deviation calculator 817f are provided.

According to experiments by the present inventors, it has been found that there are relations defined by the following (Formula 16) to (Formula 18) between the first feature amount $T_{t-m}$, the second feature amount $T_{t-s}$, and the third feature amount $T_{drop}$ and the driving-side press cylinder position $G_m$, the operation-side press cylinder position $G_s$, and the average press cylinder position $G_{ave}=(G_m+G_s)/2$.

$$T_{t-n} \propto G_m \qquad \text{(Formula 16)}$$

$$T_{t-s} \propto G_s \qquad \text{(Formula 17)}$$

$$T_{drop} \propto -G_{ave} \qquad \text{(Formula 18)}$$

The thickness of the electrode plate 2 does not increase or decrease only by a change in the press cylinder position, and it is necessary to consider elastic deformation amounts of the first pressure roller 11 and the second pressure roller 12 due to a change in the reaction force from the electrode plate 2.

The correlation between the driving-side press cylinder position $G_m$, the operation-side press cylinder position $G_s$, and the average press cylinder position $G_{ave}$ and the first feature amount $T_{t-m}$, the second feature amount $T_{t-s}$, and the third feature amount $T_{drop}$ representing the thickness of the electrode plate 2 is experimentally obtained in advance.

When the pressure difference between the driving-side bend pressure $B_m$ and the operation-side bend pressure $B_s$ is caused to be constant, a driving-side press cylinder position correction value $\Delta G_m$ and an operation-side press cylinder position correction value $\Delta G_s$ of the driving-side press cylinder position $G_m$ and the operation-side press cylinder position $G_s$ at which the first feature amount $T_{t-m}$ and the second feature amount $T_{t-s}$ become zero at the same time are obtained from the correlations shown in the above (Formula 16) and (Formula 17).

From the correlation shown in the above (Formula 18), a change amount $\Delta T_{drop}$ of the third feature amount $T_{drop}$ associated with the correction of the driving-side press cylinder position $G_m$ and the operation-side press cylinder position $G_s$ described above is obtained. From the correlation shown in the above (Formula 14), a correction value $\Delta B_{ave}$ of the average bend pressure $B_{ave}$ for causing the third feature amount $T_{drop}+\Delta T_{drop}$ to which the change amount $\Delta T_{drop}$ has been added to be zero is obtained.

The thickness over the entire width of the electrode plate 2 can be controlled to the target value $T_t$ by controlling the cylinder positions of the first press cylinder 41a and the second press cylinder 42a and the pressures of the third bend cylinder 51b, the fifth bend cylinder 51c, the fourth bend cylinder 52b, and the sixth bend cylinder 52c such that the cylinder position of the first press cylinder 41a becomes the corrected driving-side press cylinder position setting value $G_m+\Delta G_m$, the cylinder position of the second press cylinder 42a becomes the corrected operation-side press cylinder position setting value $G_s+\Delta G_s$, the pressures of the third bend cylinder 51b and the fifth bend cylinder 51c become the corrected driving-side bend pressure setting value $B_m+\Delta B_m$, and the pressures of the fourth bend cylinder 52b and the sixth bend cylinder 52c become the corrected operation-side bend pressure setting value $B_s+\Delta B_s$.

The correction value calculator 815 is supplied with the first feature amount $T_{t-m}$, the second feature amount $T_{t-s}$, and the third feature amount $T_{drop}$ from the feature amount calculator 814. In addition, the driving-side press cylinder position setting value $G_m$, the operation-side press cylinder position setting value $G_s$, the driving-side bend pressure setting value $B_m$, and the operation-side bend pressure setting value $B_s$ input by the operator via the HMI are supplied. The values derived in advance are set to the driving-side press cylinder position setting value $G_m$, the operation-side press cylinder position setting value $G_s$, the driving-side bend pressure setting value $B_m$, and the operation-side bend pressure setting value $B_s$ such that all of the first feature amount $T_{t-m}$, the second feature amount $T_{t-s}$, and the third feature amount $T_{drop}$ become zero under the standard condition.

The correction value calculator 815 calculates the driving-side press cylinder position correction value $\Delta G_m$, the operation-side press cylinder position correction value $\Delta G_s$, the driving-side bend pressure correction value $\Delta B_m$, and the operation-side bend pressure correction value $\Delta B_s$, on the basis of the first feature amount $T_{t-m}$, the second feature amount $T_{t-s}$, the third feature amount $T_{drop}$, and proportional constants of the above (Formula 16), (Formula 17), (Formula 18), and (Formula 14). The correction value calculator 815 supplies the calculated driving-side press cylinder position correction value $\Delta G_m$, operation-side press cylinder position correction value $\Delta G_s$, driving-side bend pressure correction value $\Delta B_m$, and operation-side bend pressure correction value $\Delta B_s$ to the setting value corrector 816.

The setting value corrector 816 is supplied with the driving-side press cylinder position correction value $\Delta G_m$, the operation-side press cylinder position correction value $\Delta G_s$, the driving-side bend pressure correction value $\Delta B_m$, and the operation-side bend pressure correction value $\Delta B_s$ from the correction value calculator 815. In addition, the driving-side press cylinder position setting value $G_m$, the operation-side press cylinder position setting value $G_s$, the driving-side bend pressure setting value $B_m$, and the operation-side bend pressure setting value $B_s$ input by the operator via the HMI are supplied.

The setting value corrector 816 adds the driving-side press cylinder position correction value $\Delta G_m$, the operation-side press cylinder position correction value $\Delta G_s$, the driving-side bend pressure correction value $\Delta B_m$, and the operation-side bend pressure correction value $\Delta B_s$ to the driving-side press cylinder position setting value $G_m$, the operation-side press cylinder position setting value $G_s$, the driving-side bend pressure setting value $B_m$, and the operation-side bend pressure setting value $B_s$, respectively, and calculates the corrected driving-side press cylinder position setting value $G_m+\Delta G_m$, the corrected operation-side press cylinder position setting value $G_s+\Delta G_s$, the corrected driving-side bend pressure setting value $B_m+\Delta B_m$, and the corrected operation-side bend pressure setting value $B_s+\Delta B_s$.

The setting value corrector 816 supplies the calculated corrected driving-side press cylinder position setting value $G_m+\Delta G_m$ and corrected operation-side press cylinder position setting value $G_s+\Delta G_s$ to the cylinder position deviation calculator 817f, and supplies the corrected driving-side bend pressure setting value $B_m+\Delta B_m$ and the corrected operation-side bend pressure setting value $B_3+\Delta B_s$ to the bend pressure deviation calculator 818c.

The cylinder position deviation calculator 817f calculates a deviation between the corrected driving-side press cylinder position setting value $G_m+\Delta G_m$ supplied from the setting value corrector 816 and the actual measurement value of the cylinder position of the first press cylinder 41a measured by the first magnescale 41c. In addition, the cylinder position deviation calculator 817f calculates a deviation between the corrected operation-side press cylinder position setting value $G_s+\Delta G_s$ supplied from the setting value corrector 816 and the actual measurement value of the cylinder position of the second press cylinder 42a measured by the second magnescale 42c.

The cylinder position deviation calculator 817f supplies the calculated cylinder position deviation of the first press cylinder 41a and the calculated cylinder position deviation of the second press cylinder 42a to the PID controller 817e. The PID controller 817e generates the pressure operation amount of the first press cylinder 41a and the pressure operation amount of the second press cylinder 42a, on the basis of the cylinder position deviation of the first press cylinder 41*a* and the cylinder position deviation of the second press cylinder 42*a*.

The PID controller 817*e* supplies the generated pressure operation amount of the first press cylinder 41*a* and the generated pressure operation amount of the second press cylinder 42*a* to the cylinder position controller 817*d*. The cylinder position controller 817*d* includes an actuator and drives each of the first press cylinder 41*a* and the second press cylinder 42*a* on the basis of the pressure operation amount of the first press cylinder 41*a* and the pressure operation amount of the second press cylinder 42*a*.

In the feedback control example 2, the third bend cylinder 51*b*, the fifth bend cylinder 51*c*, the fourth bend cylinder 52*b*, and the sixth bend cylinder 52*c* are controlled as the bend mechanism. Since this is basically the same as the case of controlling the first bend cylinder 51*a* and the second bend cylinder 52*a* in the feedback control example 1, the description thereof is omitted.

As described above, in the feedback control example 2, the feedback control is performed such that the position of the press cylinder maintains the setting value instead of performing the feedback control such that the pressure of the press cylinder maintains the setting value as in the feedback control example 1. The operation target is the position of the press cylinder. Even in the feedback control example 2, the feedback control is performed such that the pressure of the bend cylinder maintains the setting value. The operation target is the pressure of the bend cylinder. The thickness of the electrode plate 2 is controlled to the target value by adding the correction value calculated from the thickness measurement value to the setting value of the press cylinder position and the setting value of the bend cylinder pressure.

Figure 7:
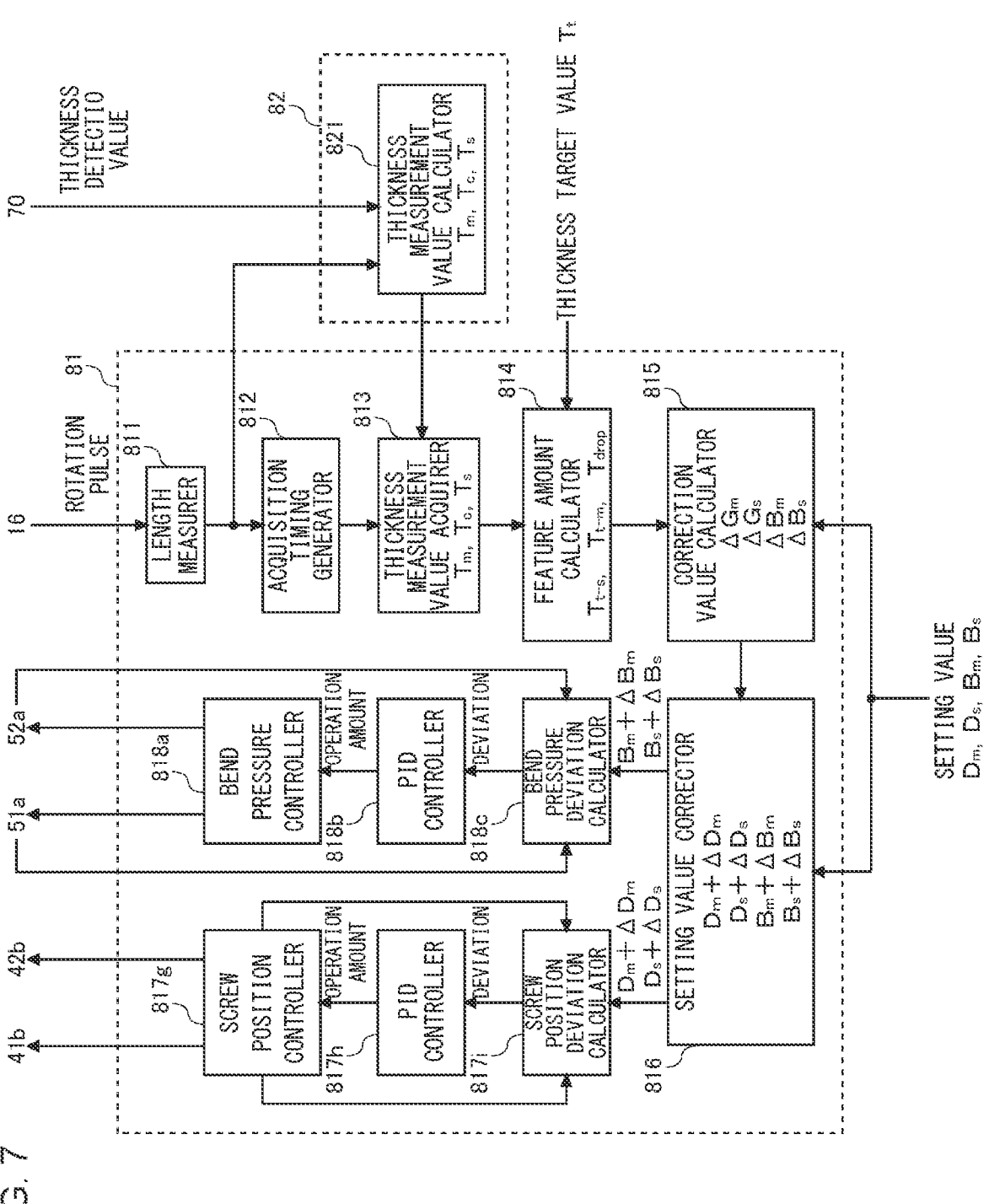
FIG. 7 is a diagram illustrating a feedback control example 3 using the first control panel and the second control panel.

FIG. 7 is a diagram illustrating a feedback control example 3 using the first control panel 81 and the second control panel 82. The feedback control example 3 is control used in the roll press device according to the first embodiment illustrated in FIG. 1. In the feedback control example 3, the first electric screw 41*b* and the second electric screw 42*b* are used as the compression mechanism. Note that a sufficiently large pressure (fixed value) is applied to the first press cylinder 41*a* and the second press cylinder 42*a* such that the position of the cylinder is not changed by position control of the first electric screw 41*b* and the second electric screw 42*b*.

The first bend cylinder 51*a* and the second bend cylinder 52*a* are used as the bend mechanism. Hereinafter, differences from the feedback control example 1 illustrated in FIG. 5 will be described. In the feedback control example 3, instead of the press pressure controller 817*a*, the PID controller 817*b*, and the press pressure deviation calculator 817*c*, a screw position controller 817*g*, a PID controller 817*h*, and a screw position deviation calculator 817*i* are provided.

According to experiments by the present inventors, it has been found that there are relations defined by the following (Formula 19) to (Formula 21) between the first feature amount $T_{t-m}$, the second feature amount $T_{t-s}$, and the third feature amount $T_{drop}$ and the driving-side electric screw position $D_m$, the operation-side electric screw position $D_s$, and the average electric screw position $D_{ave}=(D_m+D_s)/2$.

$$T_{t-n} \propto D_m \qquad \text{(Formula 19)}$$

$$T_{t-s} \propto D_s \qquad \text{(Formula 20)}$$

$$T_{drop} \propto -D_{ave} \qquad \text{(Formula 21)}$$

The thickness of the electrode plate 2 does not increase or decrease only by the change in the electric screw position, and it is necessary to consider elastic deformation amounts of the first pressure roller 11 and the second pressure roller 12 due to the change in the reaction force from the electrode plate 2.

The correlation between the driving-side electric screw position $D_m$, the operation-side electric screw position $D_s$, and the average electric screw position $D_{ave}$ and the first feature amount $T_{t-m}$, the second feature amount $T_{t-s}$, and the third feature amount $T_{drop}$ representing the thickness of the electrode plate 2 is experimentally obtained in advance.

In a case where the pressure difference between the driving-side bend pressure $B_m$ and the operation-side bend pressure $B_s$ is caused to be constant when the preload pressure is constant or when the preload mechanism is not provided, a driving-side electric screw position correction value $\Delta D_m$ and an operation-side electric screw position correction value $\Delta D_s$ of the driving-side electric screw position $D_m$ and the operation-side electric screw position $D_s$ at which the first feature amount $T_{t-m}$ and the second feature amount $T_{t-s}$ become zero at the same time are obtained from the correlations shown in the above (Formula 19) and (Formula 20).

From the correlation shown in the above (Formula 21), a change amount $\Delta T_{drop}$ of the third feature amount $T_{drop}$ associated with the correction of the driving-side electric screw position $D_m$ and the operation-side electric screw position $D_s$ described above is obtained. From the correlation shown in the above (Formula 14), a correction value $\Delta B_{ave}$ of the average bend pressure $B_{ave}$ for causing the third feature amount $T_{drop}+\Delta T_{drop}$ to which the change amount $\Delta T_{drop}$ has been added to be zero is obtained.

The thickness over the entire width of the electrode plate 2 can be controlled to the target value $T_t$ by controlling the positions of the first electric screw 41*b* and the second electric screw 42*b* and the pressures of the first bend cylinder 51*a* and the second bend cylinder 52*a* such that the position of the first electric screw 41*b* becomes a corrected driving-side electric screw position setting value $D_m+\Delta D_m$, the position of the second electric screw 42*b* becomes a corrected operation-side electric screw position setting value $D_s+\Delta D_s$, the pressure of the first bend cylinder 51*a* becomes a corrected driving-side bend pressure setting value $B_m+\Delta B_m$, and the pressure of the second bend cylinder 52*a* becomes a corrected operation-side bend pressure setting value $B_s+\Delta B_s$, respectively.

The correction value calculator 815 is supplied with the first feature amount $T_{t-m}$, the second feature amount $T_{t-s}$, and the third feature amount $T_{drop}$ from the feature amount calculator 814. In addition, the driving-side electric screw position setting value $D_m$, the operation-side electric screw position setting value $D_s$, the driving-side bend pressure setting value $B_m$, and the operation-side bend pressure setting value $B_s$ input by the operator via the HMI are supplied. The values derived in advance are set to the driving-side electric screw position setting value $D_m$, the operation-side electric screw position setting value $D_s$, the driving-side bend pressure setting value $B_m$, and the operation-side bend pressure setting value $B_s$ such that all of the first feature amount $T_{t-m}$, the second feature amount $T_{t-s}$, and the third feature amount $T_{drop}$ become zero under the standard condition.

The correction value calculator 815 calculates the driving-side electric screw position correction value $\Delta D_m$, the operation-side electric screw position correction value $\Delta D_s$, the driving-side bend pressure correction value $\Delta B_m$, and the operation-side bend pressure correction value $\Delta B_s$, on the basis of the first feature amount $T_{t-m}$, the second feature amount $T_{t-s}$, the third feature amount $T_{drop}$, and proportional constants of the above (Formula 19), (Formula 20), (Formula 21), and (Formula 14). The correction value calculator 815 supplies the calculated driving-side electric screw position correction value $\Delta D_m$, operation-side electric screw position correction value $\Delta D_s$, driving-side bend pressure correction value $\Delta B_m$, and operation-side bend pressure correction value $\Delta B_s$ to the setting value corrector 816.

The setting value corrector 816 is supplied with the driving-side electric screw position correction value $\Delta D_m$, the operation-side electric screw position correction value $\Delta D_s$, the driving-side bend pressure correction value $\Delta B_m$, and the operation-side bend pressure correction value $\Delta B_s$ from the correction value calculator 815. In addition, the driving-side electric screw position setting value $D_m$, the operation-side electric screw position setting value $D_s$, the driving-side bend pressure setting value $B_m$, and the operation-side bend pressure setting value $B_s$ input by the operator via the HMI are supplied.

The setting value corrector 816 adds the driving-side electric screw position correction value $\Delta D_m$, the operation-side electric screw position correction value $\Delta D_s$, the driving-side bend pressure correction value $\Delta B_m$, and the operation-side bend pressure correction value $\Delta B_s$ to the driving-side electric screw position setting value $D_m$, the operation-side electric screw position setting value $D_s$, the driving-side bend pressure setting value $B_m$, and the operation-side bend pressure setting value $B_s$, respectively, and calculates the corrected driving-side electric screw position setting value $D_m+\Delta D_m$, the corrected operation-side electric screw position setting value $D_s+\Delta D_s$, the corrected driving-side bend pressure setting value $B_m+\Delta B_m$, and the corrected operation-side bend pressure setting value $B_s+\Delta B_s$.

The setting value corrector 816 supplies the calculated corrected driving-side electric screw position setting value $D_m+\Delta D_m$ and corrected operation-side electric screw position setting value $D_s+\Delta D_s$ to the screw position deviation calculator 817i, and supplies the corrected driving-side bend pressure setting value $B_m+\Delta B_m$ and the corrected operation-side bend pressure setting value $B_s+\Delta B_s$ to the bend pressure deviation calculator 818c.

The screw position deviation calculator 817i calculates a deviation between the corrected driving-side electric screw position setting value $D_m+\Delta D_m$ supplied from the setting value corrector 816 and the measurement value of the position of the first electric screw 41b. In addition, the screw position deviation calculator 817i calculates a deviation between the corrected operation-side electric screw position setting value $D_s+\Delta D_s$ supplied from the setting value corrector 816 and the measurement value of the position of the second electric screw 42b.

The screw position controller 817g includes servo motors for reducing the pressures of the first electric screw 41b and the second electric screw 42b, respectively. A position change amount of each of the first electric screw 41b and the second electric screw 42b can be calculated from the rotation speed of each servomotor.

The screw position deviation calculator 817i supplies the calculated position deviation of the first electric screw 41b and the calculated position deviation of the second electric screw 42b to the PID controller 817h. The PID controller 817h generates a rotation operation amount of the servomotor for the first electric screw 41b and a rotation operation amount of the servomotor for the second electric screw 42b, on the basis of the position deviation of the first electric screw 41b and the position deviation of the second electric screw 42b.

The PID controller 817h supplies the generated rotation operation amount of the servomotor for the first electric screw 41b and the generated rotation operation amount of the servomotor for the second electric screw 42b to the screw position controller 817g. The screw position controller 817g drives each of the servomotor for the first electric screw 41b and the servomotor for the second electric screw 42b, on the basis of the rotation operation amount of the servomotor for the first electric screw 41b and the rotation operation amount of the servomotor for the second electric screw 42b.

As described above, in the feedback control example 3, the feedback control is performed such that the position of the electric screw maintains the setting value instead of performing the feedback control such that the pressure of the press cylinder maintains the setting value as in the feedback control example 1. The operation target is the rotation speed of the servo motor. Even in the feedback control example 3, the feedback control is performed such that the pressure of the bend cylinder maintains the setting value. The operation target is the pressure of the bend cylinder. The thickness of the electrode plate 2 is controlled to the target value by adding the correction value calculated from the thickness measurement value to the setting value of the position of the electric screw and the setting value of the bend cylinder pressure.

Figure 8:
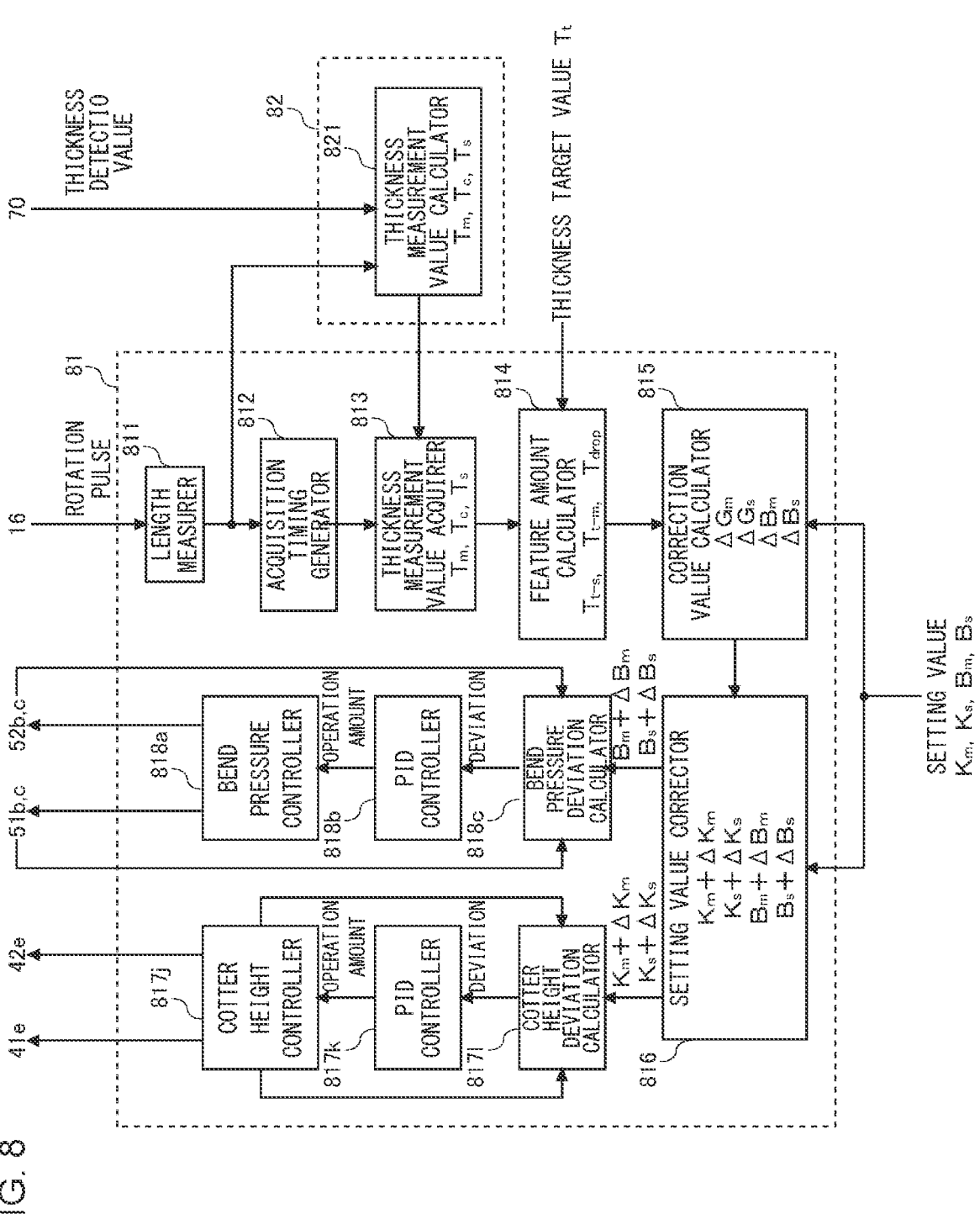
FIG. 8 is a diagram illustrating a feedback control example 4 using the first control panel and the second control panel.

FIG. 8 is a diagram illustrating a feedback control example 4 using the first control panel 81 and the second control panel 82. The feedback control example 4 is control used in the roll press device according to the third embodiment illustrated in FIG. 3. In the feedback control example 4, the first electric cotter 41e and the second electric cotter 42e are used as the compression mechanism. Note that a sufficiently large pressure (fixed value) is applied to the first press cylinder 41a and the second press cylinder 42a such that the position of the cylinder is not changed by the height control of the first electric cotter 41e and the second electric cotter 42e.

As the bend mechanism, at least one of the third bend cylinder 51b or the fifth bend cylinder 51c and at least one of the fourth bend cylinder 52b or the sixth bend cylinder 52c are used. Hereinafter, differences from the feedback control example 1 illustrated in FIG. 5 will be described. In the feedback control example 4, instead of the press pressure controller 817a, the PID controller 817b, and the press pressure deviation calculator 817c, a cotter height controller 817j, a PID controller 817k, and a cotter height deviation calculator 817l are provided.

In a state where the first electric cotter 41e and the second electric cotter 42e are in contact with the first press cylinder 41a and the second press cylinder 42a, and the first pressure roller 11 and the second pressure roller 12 are in contact with the electrode plate 2, a part of the press load by the first press cylinder 41a and the second press cylinder 42a is dispersed in the first electric cotter 41e and the second electric cotter 42e, so that (load acting on the electrode plate 2) is represented by (press load)−(load acting on the cotter).

When the pressures of the first press cylinder 41a and the second press cylinder 42a are constant, the press load is constant. In this state, the load acting on the electrode plate 2 can be changed by changing the cotter height to change the load acting on the cotter. It is difficult to measure a change in load acting on each of the first electric cotter 41e and the second electric cotter $42e$ due to a change in height of each of the first electric cotter $41e$ and the second electric cotter $42e$.

According to experiments by the present inventors, it has been found that there are relations defined by the following (Formula 22) to (Formula 24) between the first feature amount $T_{t-m}$, the second feature amount $T_{t-s}$, and the third feature amount $T_{drop}$ and the driving-side electric cotter height $K_m$, the operation-side electric cotter height $K_s$, and the average electric cotter height $K_{ave}=(K_m+K_s)/2$.

$$T_{t-n} \propto K_m \quad \text{(Formula 22)}$$

$$T_{t-s} \propto K_s \quad \text{(Formula 23)}$$

$$T_{drop} \propto -K_{ave} \quad \text{(Formula 24)}$$

The correlation between the driving-side electric cotter height $K_m$, the operation-side electric cotter height $K_s$, and the average electric cotter height $K_{ave}$ and the first feature amount $T_{t-m}$, the second feature amount $T_{t-s}$, and the third feature amount $T_{drop}$ representing the thickness of the electrode plate 2 is experimentally obtained in advance.

When the pressure difference between the driving-side bend pressure $B_m$ and the operation-side bend pressure $B_s$ is caused to be constant, a driving-side electric cotter height correction value $\Delta K_m$ and an operation-side electric cotter height correction value $\Delta K_s$ of the driving-side electric cotter height $K_m$ and the operation-side electric cotter height $K_s$ at which the first feature amount $T_{t-m}$ and the second feature amount $T_{t-s}$ become zero at the same time are obtained from the correlations shown in the above (Formula 22) and (Formula 23).

From the correlation shown in the above (Formula 24), a change amount $\Delta T_{drop}$ of the third feature amount $T_{drop}$ associated with the correction of the driving-side electric cotter height $K_m$ and the operation-side electric cotter height $K_s$ described above is obtained. From the correlation shown in the above (Formula 14), a correction value $\Delta B_{ave}$ of the average bend pressure $B_{ave}$ for causing the third feature amount $T_{drop}+\Delta T_{drop}$ to which the change amount $\Delta T_{drop}$ has been added to be zero is obtained.

The thickness over the entire width of the electrode plate 2 can be controlled to the target value $T_t$ by controlling the heights of the first electric cotter 41$e$ and the second electric cotter 42$e$ and the pressures of the third bend cylinder 51$b$, the fifth bend cylinder 51$c$, the fourth bend cylinder 52$b$, and the sixth bend cylinder 52$c$ such that the height of the first electric cotter 41$e$ becomes a corrected driving-side electric cotter height setting value $K_m+\Delta K_m$, the height of the second electric cotter 42$e$ becomes a corrected operation-side electric cotter height setting value $K_s+\Delta K_s$, the pressures of the third bend cylinder 51$b$ and the fifth bend cylinder 51$c$ become a corrected driving-side bend pressure setting value $B_m+\Delta B_m$, and the pressures of the fourth bend cylinder 52$b$ and the sixth bend cylinder 52$c$ becomes a corrected operation-side bend pressure setting value $B_s+\Delta B_s$.

The correction value calculator 815 is supplied with the first feature amount $T_{t-m}$, the second feature amount $T_{t-s}$, and the third feature amount $T_{drop}$ from the feature amount calculator 814. In addition, the driving-side electric cotter height setting value $K_m$, the operation-side electric cotter height setting value $K_s$, the driving-side bend pressure setting value $B_m$, and the operation-side bend pressure setting value $B_s$ input by the operator via the HMI are supplied. The values derived in advance are set to the driving-side electric cotter height setting value $K_m$, the operation-side electric cotter height setting value $K_s$, the driving-side bend pressure setting value $B_m$, and the operation-side bend pressure setting value $B_s$ such that all of the first feature amount $T_{t-m}$, the second feature amount $T_{t-s}$, and the third feature amount $T_{drop}$ become zero under the standard condition.

The correction value calculator 815 calculates the driving-side electric cotter height correction value $\Delta K_m$, the operation-side electric cotter height correction value $\Delta K_s$, the driving-side bend pressure correction value $\Delta B_m$, and the operation-side bend pressure correction value $\Delta B_s$, on the basis of the first feature amount $T_{t-m}$, the second feature amount $T_{t-s}$, the third feature amount $T_{drop}$, and proportional constants of the above (Formula 22), (Formula 23), (Formula 24), and (Formula 14). The correction value calculator 815 supplies the calculated driving-side electric cotter height correction value $\Delta K_m$, operation-side electric cotter height correction value $\Delta K_s$, driving-side bend pressure correction value $\Delta B_m$, and operation-side bend pressure correction value $\Delta B_s$ to the setting value corrector 816.

The setting value corrector 816 is supplied with the driving-side electric cotter height correction value $\Delta K_m$, the operation-side electric cotter height correction value $\Delta K_s$, the driving-side bend pressure correction value $\Delta B_m$, and the operation-side bend pressure correction value $\Delta B_s$ from the correction value calculator 815. In addition, the driving-side electric cotter height setting value $K_m$, the operation-side electric cotter height setting value $K_s$, the driving-side bend pressure setting value $B_m$, and the operation-side bend pressure setting value $B_s$ input by the operator via the HMI are supplied.

The setting value corrector 816 adds the driving-side electric cotter height correction value $\Delta K_m$, the operation-side electric cotter height correction value $\Delta K_s$, the driving-side bend pressure correction value $\Delta B_m$, and the operation-side bend pressure correction value $\Delta B_s$ to the driving-side electric cotter height setting value $K_m$, the operation-side electric cotter height setting value $K_s$, the driving-side bend pressure setting value $B_m$, and the operation-side bend pressure setting value $B_s$, respectively, and calculates the corrected driving-side electric cotter height setting value $K_m+\Delta K_m$, the corrected operation-side electric cotter height setting value $K_3+\Delta K_s$, the corrected driving-side bend pressure setting value $B_m+\Delta B_m$, and the corrected operation-side bend pressure setting value $B_3+\Delta B_s$.

The setting value corrector 816 supplies the calculated corrected driving-side electric cotter height setting value $K_m+\Delta K_m$ and corrected operation-side electric cotter height setting value $K_s+\Delta K_s$ to the cotter height deviation calculator 817$l$, and supplies the corrected driving-side bend pressure setting value $B_m+\Delta B_m$ and the corrected operation-side bend pressure setting value $B_3+\Delta B_s$ to the bend pressure deviation calculator 818$c$.

The cotter height deviation calculator 817$l$ calculates a deviation between the corrected driving-side electric cotter height setting value $K_m+\Delta K_m$ supplied from the setting value corrector 816 and the measurement value of the height of the first electric cotter 41$e$. In addition, the cotter height deviation calculator 817$l$ calculates a deviation between the corrected operation-side electric cotter height setting value $K_3+\Delta K_s$ supplied from the setting value corrector 816 and the measurement value of the height of the second electric cotter 42$e$.

The cotter height controller 817$j$ includes linear servo motors for sliding the lower cotters of the first electric cotter 41$e$ and the second electric cotter 42$e$ in the left-right direction. The height change amount of each of the first electric cotter 41$e$ and the second electric cotter 42$e$ can be calculated from the movement amount of each linear servo motor. Note that a distance meter may be provided between the first main bearing 21 and the third main bearing 23 to measure the height of the first electric cotter 41e, and a distance meter may be provided between the second main bearing 22 and the fourth main bearing 24 to measure the height of the second electric cotter 42e.

The cotter height deviation calculator 817l supplies the calculated height deviation of the first electric cotter 41e and the calculated height deviation of the second electric cotter 42e to the PID controller 817k. The PID controller 817k generates a movement operation amount of the linear servo motor for the first electric cotter 41e and a movement operation amount of the linear servo motor for the second electric cotter 42e, on the basis of the height deviation of the first electric cotter 41e and the height deviation of the second electric cotter 42e.

The PID controller 817k supplies the generated movement operation amount of the linear servo motor for the first electric cotter 41e and the generated movement operation amount of the linear servo motor for the second electric cotter 42e to the cotter height controller 817j. The cotter height controller 817j drives the linear servo motor for the first electric cotter 41e and the linear servo motor for the second electric cotter 42e, on the basis of the movement operation amount of the linear servo motor for the first electric cotter 41e and the movement operation amount of the linear servo motor for the second electric cotter 42e.

In the feedback control example 4, the third bend cylinder 51b, the fifth bend cylinder 51c, the fourth bend cylinder 52b, and the sixth bend cylinder 52c are controlled as the bend mechanism. Since this is basically the same as the case of controlling the first bend cylinder 51a and the second bend cylinder 52a in the feedback control example 1, the description thereof is omitted.

As described above, in the feedback control example 4, the feedback control is performed such that the height of the electric cotter maintains the setting value instead of performing the feedback control such that the pressure of the press cylinder maintains the setting value as in the feedback control example 1. The operation target is the movement amount of the linear servo motor. Even in the feedback control example 4, the feedback control is performed such that the pressure of the bend cylinder maintains the setting value. The operation target is the pressure of the bend cylinder. The thickness of the electrode plate 2 is controlled to the target value by adding the correction value calculated from the thickness measurement value to the setting value of the height of the electric cotter and the setting value of the bend cylinder pressure.

When a hydraulic cylinder is used for the first press cylinder 41a, the second press cylinder 42a, the first bend cylinder 51a, the second bend cylinder 52a, the third bend cylinder 51b, the fourth bend cylinder 52b, the fifth bend cylinder 51c, and the sixth bend cylinder 52c described above, it is desirable to install a hydraulic control device as close as possible to the hydraulic cylinder. In addition, it is desirable to use a hydraulic servo valve having a high pressure control speed as the hydraulic control device. As a result, it is possible to prevent the delay of the pressure response and the pressure hunting caused by the pressure change of the hydraulic pipe due to the pressure change of the hydraulic cylinder.

Incidentally, in the method for measuring the thickness of the electrode plate 2 during being conveyed by the thickness meter 70 and correcting the thickness of the electrode plate 2 by the feedback control described in the feedback control examples 1 to 4, it is difficult to correct the thickness change at the time of acceleration or deceleration of the conveyance line with high accuracy. It is also conceivable to decrease the speed at the time of acceleration or deceleration of the conveyance line, but in this case, production efficiency is lowered. Therefore, a method for predicting the thickness change of the electrode plate 2 due to the speed change of the conveyance line and correcting the thickness of the electrode plate 2 by feedforward control is introduced.

Figure 9:
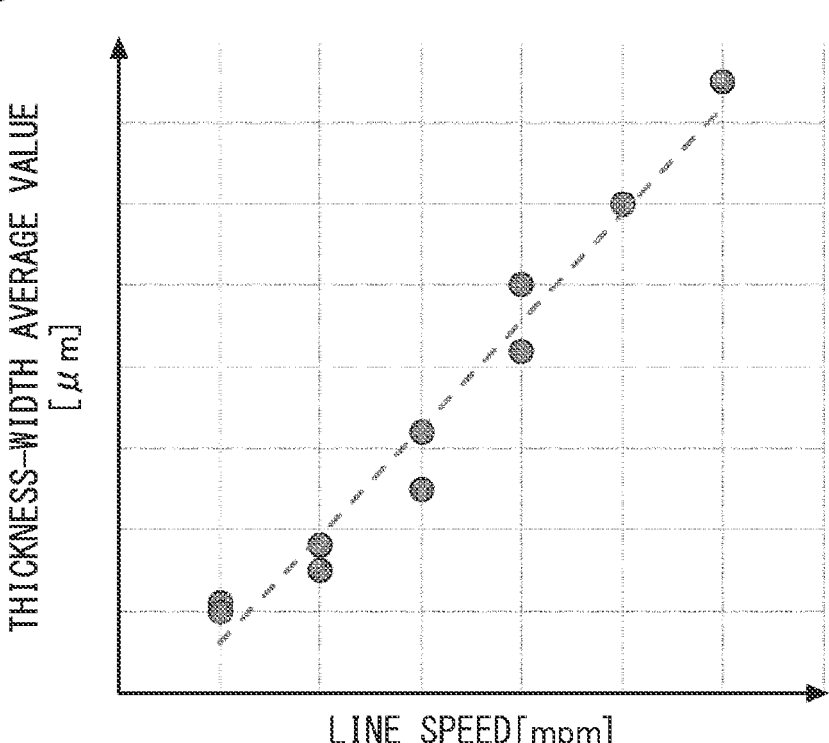
FIG. 9 is a diagram plotting a relation between a change in line speed and a change in thickness of an electrode plate under a constant press-bend condition in a certain roll press device.

FIG. 9 is a diagram plotting a relation between a change in line speed and a change in thickness of the electrode plate 2 under a constant press-bend condition in the certain roll press device 1. A horizontal axis represents a line speed [mpm], and a vertical axis represents a thickness-width average value [μm] of the electrode plate 2. As illustrated in FIG. 9, it can be seen that the thickness of the electrode plate 2 increases as the line speed increases.

Figure 10:
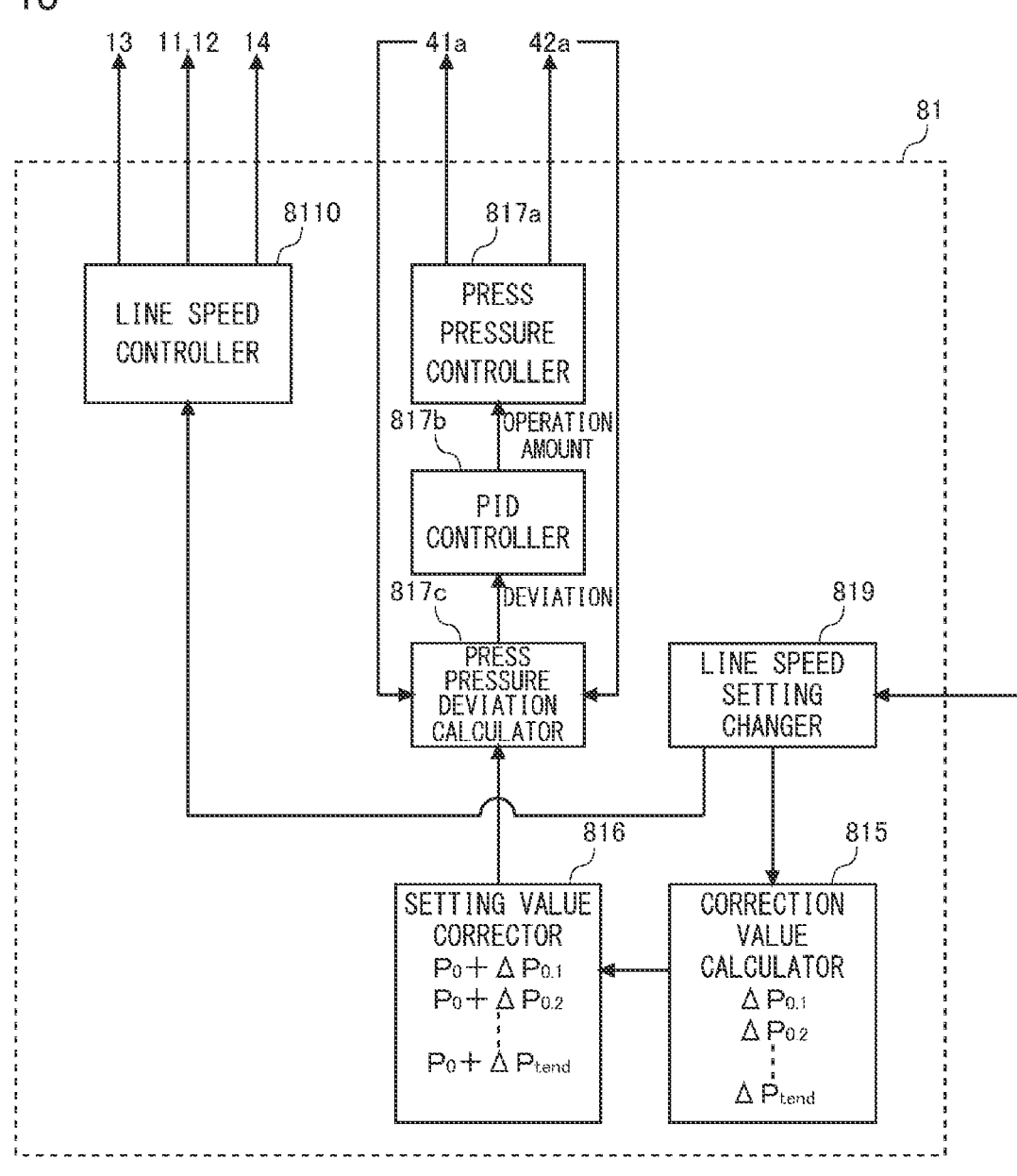
FIG. 10 is a diagram illustrating a feedforward control example 1 using the first control panel.

FIG. 10 is a diagram illustrating a feedforward control example 1 using the first control panel 81. The feedforward control example 1 is control used in the roll press device according to the first embodiment illustrated in FIG. 1. In the feedforward control example 1, the first press cylinder 41a and the second press cylinder 42a are used as the compression mechanism. In the present specification, in order to simplify the feedforward control, the bend mechanism is not used for the feedforward control.

FIG. 10 illustrates functional blocks realized by the first control panel 81 related to the feedforward control example 1. The first control panel 81 includes a line speed setting changer 819, a line speed controller 8110, a correction value calculator 815, a setting value corrector 816, a press pressure controller 817a, a PID controller 817b, and a press pressure deviation calculator 817c.

The line speed controller 8110 controls the rotation speed of the unwinder 13, the rotation speeds of the first pressure roller 11 and the second pressure roller 12, and the rotation speed of the winder 14, on the basis of a command value of the line speed supplied from the line speed setting changer 819.

The line speed set by the operator is input to the line speed setting changer 819. The acceleration at the time of acceleration and the deceleration at the time of deceleration of the conveyance line are basically set in advance by the manufacturer of the roll press device 1. Note that the acceleration at the time of acceleration and the deceleration at the time of deceleration may be specifications that can be set and changed by the user.

In the feedforward control example 1, a thickness change of the electrode plate 2 due to a change in line speed is predicted, a press load necessary for maintaining the thickness of the electrode plate 2 constantly is calculated, and the press load is changed by feedforward control. By experimentally investigating the relation between the line speed and the thickness of the electrode plate 2, an appropriate press pressure can be predicted with high accuracy.

When the acceleration or deceleration of the line speed is a [m/s²], the line speed $V_s$ after S seconds from the start of acceleration or deceleration can be defined as the following (Formula 25) by using a speed $V_0$ at the start of acceleration or deceleration and a change amount $\Delta V_s$ of the line speed after S seconds from the start of acceleration or deceleration. The change amount $\Delta V_s$ of the line speed after S seconds from the start of acceleration or deceleration can be defined as the following (Formula 26).

$$V_s = V_0 + \Delta V_s = V_0 + \alpha \times S \qquad \text{(Formula 25)}$$

$$\Delta V_s = V_s - V_0 = \alpha \times S \qquad \text{(Formula 26)}$$

As illustrated in FIG. 9, the change amount $\Delta V_s$ of the line speed after S seconds and the change amount $\Delta T_{ave}$ of the thickness average value $T_{ave}$ in the width direction of the electrode plate 2 are in a proportional relation, so that a relation of the following (Formula 27) holds.

$$\Delta T_{ave}=D\times\Delta V_s \qquad \text{(Formula 27)}$$

D is a proportional constant.

The relation between the change amount $\Delta V$ of the line speed and the change amount $\Delta T_{ave}$ of the thickness average value $T_{ave}$ may be experimentally obtained and fitted with a multidimensional function, an exponential function, or a logarithmic function.

In addition, since the average value $L_{ave}$ (hereinafter, referred to as a linear pressure) of the press load acting on the electrode plate 2 in the width direction and the thickness average value $T_{ave}$ after pressing are in a proportional relation, a relation of the following (Formula 28) holds between the change amount $\Delta L_{ave}$ of the linear pressure and the change amount $\Delta T_{ave}$ of the thickness average value $T_{ave}$ when the linear pressure is changed.

$$\Delta T_{ave}=E\times\Delta L_{ave} \qquad \text{(Formula 28)}$$

E is a proportional constant.

The correction value $\Delta L_{ave,s}$ of the linear pressure for causing the change amount $\Delta T_{ave,s}$ of the thickness average value $T_{ave}$ after S seconds from the start of acceleration or deceleration to be zero can be obtained by the following (Formula 29) after removing $\Delta V_s$ and $\Delta T_{ave}$ from the relations of the above (Formula 26), (Formula 27), and (Formula 28).

$$\Delta L_{ave,s}=\{(D\times\alpha)/E\}\times S \qquad \text{(Formula 29)}$$

When the linear pressure at the time of acceleration or deceleration is $L_{ave,0}$, the thickness change of the electrode plate 2 due to the change in the line speed can be reduced by feedforward-controlling the press mechanism such that the linear pressure after S seconds becomes $L_{ave,0}+\Delta L_{ave,s}$.

In the feedforward control example 1, by causing the positions of the first electric screw 41b and the second electric screw 42b to be constant and changing the pressures of the first press cylinder 41a and the second press cylinder 42a, the press load acting on the electrode plate 2 is changed. Since there is a proportional relation between the change amount $\Delta P_{ave}$ of the average press pressure $P_{ave}=(P_m+P_s)/2$ of the driving-side press pressure $P_m$ and the operation-side press pressure $P_s$ and the change amount $\Delta T_{ave}$ of the thickness average value $T_{ave}$ of the electrode plate 2, a relation of the following (Formula 30) holds between the change amount $\Delta P_{ave}$ of the average press pressure $P_{ave}$ and the change amount $\Delta T_{ave}$ of the thickness average value $T_{ave}$ when the press pressure is changed.

$$\Delta T_{ave}=F\times\Delta P_{ave} \qquad \text{(Formula 30)}$$

F is a proportional constant.

The correction value $\Delta P_{ave,s}$ of the average press pressure $P_{ave}$ for causing the change amount $\Delta T_{ave,s}$ of the thickness average value $T_{ave}$ after S seconds from the start of acceleration or deceleration to be zero can be obtained by the following (Formula 31) after removing $\Delta V_s$ and $\Delta T_{ave}$ from the relations of the above (Formula 26), (Formula 27), and (Formula 30).

$$\Delta P_{ave,s}=\{(D\times\alpha)/F\}\times S \qquad \text{(Formula 31)}$$

When the average press pressure at the time of acceleration or deceleration is $P_{ave,0}$, the pressures of the first press cylinder 41a and the second press cylinder 42a are feedforward-controlled such that the average press pressure after S seconds becomes $P_{ave,0}+\Delta P_{ave,s}$. As a result, the thickness change of the electrode plate 2 due to the change in the line speed can be suppressed.

A differential pressure between the driving-side press pressure $P_m$ and the operation-side press pressure $P_s$ during an acceleration period or a deceleration period of the conveyance line may be basically the same as that before the acceleration or the deceleration. Note that, when the thickness change of the electrode plate 2 due to the change in the line speed is different between the driving side and the operation side due to the difference in rigidity between the driving side and the operation side of the roll press device 1, the differential pressure during the acceleration period or the deceleration period may be changed.

The correction value calculator 815 is supplied with the acceleration start time, the acceleration end time, the line speed $V_0$ at the start of acceleration, and the acceleration $\alpha$ from the line speed setting changer 819, before the start of acceleration of the conveyance line. For example, when the roll press device 1 starts and when the line speed changes during starting, these pieces of information are supplied from the line speed setting changer 819. In addition, the correction value calculator 815 is supplied with the deceleration start time, the deceleration end time, the line speed $V_0$ at the start of deceleration, and the deceleration a from the line speed setting changer 819, before the start of deceleration of the conveyance line.

The correction value calculator 815 calculates a change amount $\Delta V_s$ of the line speed after S seconds from the start of the acceleration, on the basis of the above (Formula 26), the line speed $V_0$ at the start of the acceleration, and the acceleration $\alpha$. The correction value calculator 815 applies the calculated change amount $\Delta V_s$ of the line speed to the above (Formula 27) to predict the change amount $\Delta T_{ave,s}$ of the thickness average value $T_{ave}$ after S seconds from the start of acceleration. The correction value calculator 815 calculates a correction value $\Delta P_{ave,s}$ of the average press pressure $P_{ave}$ for causing the change amount $\Delta T_{ave,s}$ of the thickness average value $T_{ave}$ to be zero, on the basis of the above (Formula 31).

In the example illustrated in FIG. 10, the correction value calculator 815 calculates correction values $\Delta P_{0.1}$, $\Delta P_{0.2}$, . . . , and $\Delta P_{tend}$ of the average press pressure $P_{ave}$ at intervals of 0.1 seconds, and supplies the calculated correction values $\Delta P_{0.1}$, $\Delta P_{0.2}$, . . . , and $\Delta P_{tend}$ of the average press pressure $P_{ave}$ to the setting value corrector 816.

The setting value corrector 816 is supplied with the correction values $\Delta P_{0.1}$, $\Delta P_{0.2}$, . . . , and $\Delta P_{tend}$ of the average press pressure $P_{ave}$ from the correction value calculator 815. The setting value corrector 816 adds the correction values $\Delta P_{0.1}$, $\Delta P_{0.2}$, . . . , and $\Delta P_{tend}$ to the press pressure setting value $P_0$ at the start of acceleration to calculate corrected press pressure setting values $P_0+\Delta P_{0.1}$, $P_0+\Delta P_{0.2}$, . . . , and $P_0+\Delta P_{tend}$. The press pressure setting value $P_0$ at the start of acceleration is, for example, the press pressure setting value P input by the operator via the HMI. The setting value corrector 816 supplies the calculated corrected press pressure setting values $P_0+\Delta P_{0.1}$, $P_0+\Delta P_{0.2}$, . . . , and $P_0+\Delta P_{tend}$ to the press pressure deviation calculator 817c.

The press pressure deviation calculator 817c calculates, at each time, a deviation between the press pressure setting value of the corrected press pressure setting values $P_0+\Delta P_{0.1}$, $P_0+\Delta P_{0.2}$, . . . , and $P_0+\Delta P_{tend}$ supplied from the setting value corrector 816 allocated to the first press cylinder 41a and the actually measured pressure value of the first press cylinder 41a. In addition, the press pressure deviation calculator 817c calculates, at each time, a deviation between the press pressure setting value of the corrected press pressure setting values $P_0+\Delta P_{0.1}$, $P_0+\Delta P_{0.2}$, . . . , and $P_0+\Delta P_{tend}$ supplied from the setting value corrector 816 allocated to the second press cylinder 42a and the actually measured pressure value of the second press cylinder 42a. Each of the actually measured pressure value of the first press cylinder 41a and the actually measured pressure value of the second press cylinder 42a can be estimated according to, for example, a measurement value of a valve opening meter.

The press pressure deviation calculator 817c supplies the calculated pressure deviation of the first press cylinder 41a and the calculated pressure deviation of the second press cylinder 42a to the PID controller 817b. The PID controller 817b generates a pressure operation amount of the first press cylinder 41a and a pressure operation amount of the second press cylinder 42a, on the basis of the pressure deviation of the first press cylinder 41a and the pressure deviation of the second press cylinder 42a.

The PID controller 817b supplies the generated pressure operation amount of the first press cylinder 41a and the generated pressure operation amount of the second press cylinder 42a to the press pressure controller 817a. The press pressure controller 817a includes an actuator and drives each of the first press cylinder 41a and the second press cylinder 42a on the basis of the pressure operation amount of the first press cylinder 41a and the pressure operation amount of the second press cylinder 42a. Although acceleration is assumed in the above description, the same control is performed during deceleration.

It is necessary to consider a delay time (time lag $t_e$) from the change of the press pressure setting value to the change of the actual press pressure. Therefore, the line speed setting changer 819 supplies a command value for the line speed change to the line speed controller 8110 at timing delayed by a time corresponding to the time lag $t_e$ from timing at which a command to change the setting value of the press pressure is given to the correction value calculator 815. As a result, the operation of the actuator can be more appropriately changed with respect to the change in the line speed, and the thickness of the electrode plate 2 can be corrected with high accuracy. As described above, it is desirable to use a highly responsive hydraulic servo valve for pressure control of the first press cylinder 41a and the second press cylinder 42a.

As described above, in the feedforward control example 1, the thickness change of the electrode plate 2 due to the change in the line speed is predicted, the press pressure necessary for maintaining the thickness of the electrode plate 2 constantly is calculated, and the press pressure is changed by feedforward control. As a result, the thickness change of the electrode plate 2 during the acceleration period or the deceleration period of the conveyance line can be suppressed with high accuracy.

Figure 11:
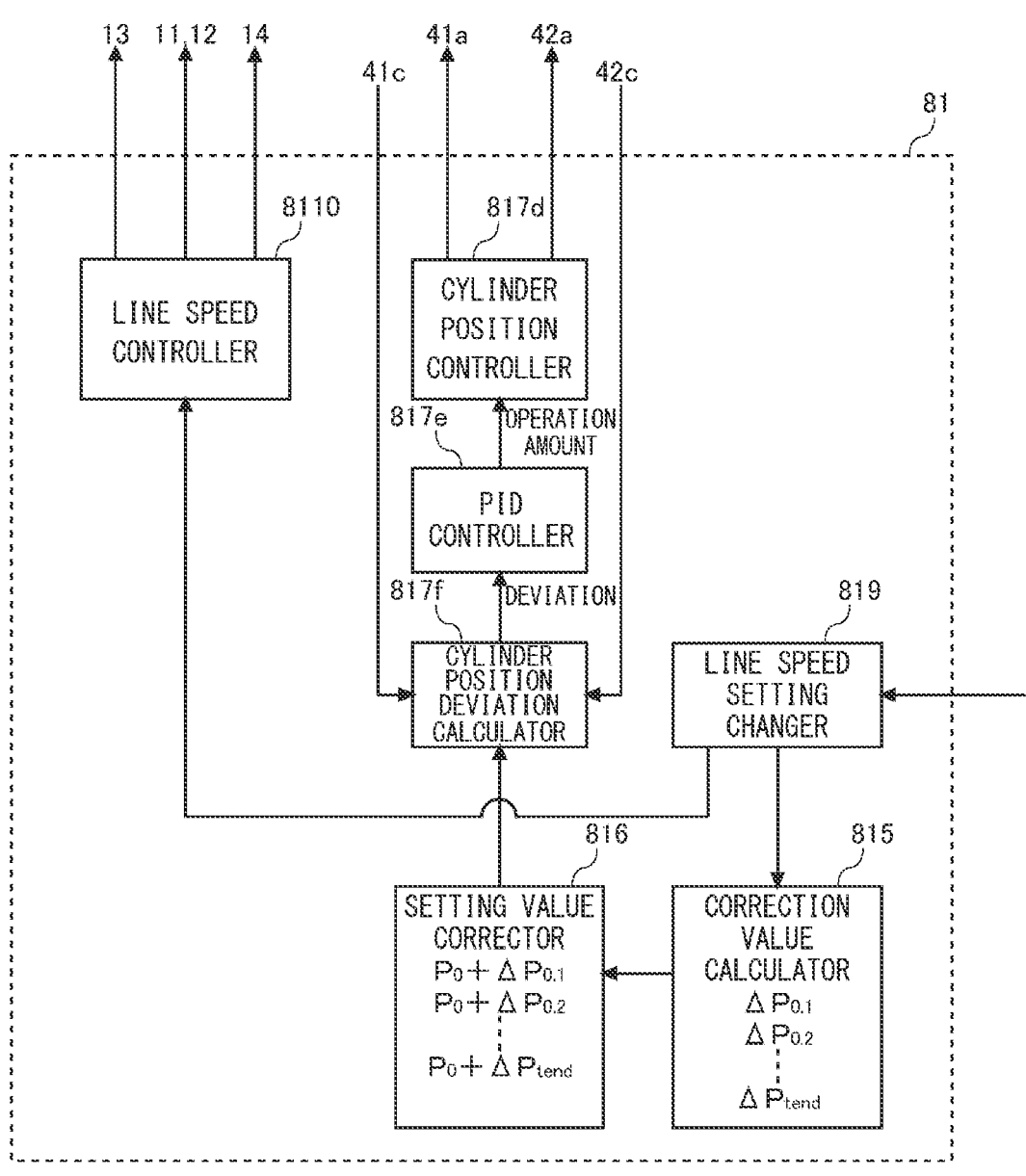
FIG. 11 is a diagram illustrating a feedforward control example 2 using the first control panel.

FIG. 11 is a diagram illustrating a feedforward control example 2 using the first control panel 81. The feedforward control example 2 is control used in the roll press device according to the second embodiment illustrated in FIG. 2. In the feedforward control example 2, the first press cylinder 41a and the second press cylinder 42a are used as the compression mechanism. Hereinafter, differences from the feedforward control example 1 illustrated in FIG. 10 will be described. In the feedforward control example 2, instead of the press pressure controller 817a, the PID controller 817b, and the press pressure deviation calculator 817c, a cylinder position controller 817d, a PID controller 817e, and a cylinder position deviation calculator 817f are provided.

In the feedforward control example 2, by causing the positions of the first electric screw 41b and the second electric screw 42b to be constant and changing the pressures of the first press cylinder 41a and the second press cylinder 42a, the press load acting on the electrode plate 2 is changed. The cylinder position of the first press cylinder 41a is measured by the first magnescale 41c, and the pressure of the first press cylinder 41a is controlled such that the cylinder position of the first press cylinder 41a maintains the setting value. Similarly, the cylinder position of the second press cylinder 42a is measured by the second magnescale 42c, and the pressure of the second press cylinder 42a is controlled such that the cylinder position of the second press cylinder 42a maintains the setting value. Since there is a proportional relation between the change amount $\Delta G_{ave}$ of the average press cylinder position $G_{ave}=(G_m+G_s)/2$ of the driving-side press cylinder position $G_m$ and the operation-side press cylinder position $G_s$ and the change amount $\Delta T_{ave}$ of the thickness average value $T_{ave}$ of the electrode plate 2, a relation of the following (Formula 32) holds between the change amount $\Delta G_{ave}$ of the average press cylinder position $G_{ave}$ and the change amount $\Delta T_{ave}$ of the thickness average value $T_{ave}$ when the cylinder position is changed.

$$\Delta T_{ave}=G\times\Delta G_{ave} \tag{Formula 32}$$

G is a proportional constant.

The correction value $\Delta G_{ave,s}$ of the average press cylinder position $G_{ave}$ for causing the change amount $\Delta T_{ave,s}$ of the thickness average value $T_{ave}$ after S seconds from the start of acceleration or deceleration to be zero can be obtained by the following (Formula 33) after removing $\Delta V_s$ and $\Delta T_{ave}$ from the relations of the above (Formula 26), (Formula 27), and (Formula 32).

$$\Delta G_{ave,s}=\{(D\times\alpha)/G\}\times S \tag{Formula 33}$$

When the average press cylinder position at the time of acceleration or deceleration is $G_{ave,0}$, the cylinder positions of the first press cylinder 41a and the second press cylinder 42a are feedforward-controlled such that the average press cylinder position after S seconds becomes $G_{ave,0}+\Delta G_{ave,s}$. As a result, a change in the thickness of the electrode plate 2 due to a change in the line speed can be suppressed.

The difference between the driving-side press cylinder position $G_m$ and the operation-side press cylinder position $G_s$ during the acceleration period or the deceleration period of the conveyance line may be basically the same as that before the acceleration or the deceleration. Note that, when the thickness change of the electrode plate 2 due to the change in line speed is different between the driving side and the operation side due to the difference in rigidity between the driving side and the operation side of the roll press device 1, the difference during the acceleration period or the deceleration period may be changed.

The correction value calculator 815 is supplied with the acceleration start time, the acceleration end time, the line speed $V_0$ at the start of acceleration, and the acceleration $\alpha$ from the line speed setting changer 819, before the start of acceleration of the conveyance line. In addition, the correction value calculator 815 is supplied with the deceleration start time, the deceleration end time, the line speed $V_0$ at the start of deceleration, and the deceleration a from the line speed setting changer 819, before the start of deceleration of the conveyance line.

The correction value calculator 815 calculates a change amount $\Delta V_s$ of the line speed after S seconds from the start of the acceleration, on the basis of the above (Formula 26), the line speed $V_0$ at the start of the acceleration, and the acceleration $\alpha$. The correction value calculator 815 applies the calculated change amount $\Delta V_s$ of the line speed to the above (Formula 27) to predict the change amount $\Delta T_{ave,s}$ of the thickness average value $T_{ave}$ after S seconds from the start of acceleration. The correction value calculator 815 calculates a correction value $\Delta G_{ave,s}$ of the average press cylinder position $G_{ave}$ for causing the change amount $\Delta T_{ave,s}$ of the thickness average value $T_{ave}$ to be zero, on the basis of the above (Formula 33).

In the example illustrated in FIG. 11, the correction value calculator 815 calculates the correction values $\Delta G_{0.1}$, $\Delta G_{0.2}$, . . . , and $\Delta G_{tend}$ of the average press cylinder position $G_{ave}$ at intervals of 0.1 seconds, and supplies the calculated correction values $\Delta G_{0.1}$, $\Delta G_{0.2}$, . . . , and $\Delta G_{tend}$ of the average press cylinder position $G_{ave}$ to the setting value corrector 816.

The setting value corrector 816 is supplied with the correction values $\Delta G_{0.1}$, $\Delta G_{0.2}$, . . . , and $\Delta G_{tend}$ of the average press cylinder position $G_{ave}$ from the correction value calculator 815. The setting value corrector 816 adds the correction values $\Delta G_{0.1}$, $\Delta G_{0.2}$, . . . , and $\Delta G_{tend}$ to the press cylinder position setting value $G_0$ at the start of acceleration to calculate corrected press cylinder position setting values $G_0+\Delta G_{0.1}$, $G_0+\Delta G_{02}$, . . . , and $G_0+\Delta G_{tend}$. The press cylinder position setting value $G_0$ at the start of acceleration is, for example, the press cylinder position setting value G input by the operator via the HMI. The setting value corrector 816 supplies the calculated corrected press cylinder position setting values $G_0+\Delta G_{0.1}$, $G_0+\Delta G_{0.2}$, . . . , and $G_0+\Delta G_{tend}$ to the cylinder position deviation calculator 817f.

The cylinder position deviation calculator 817f calculates a deviation between the corrected press cylinder position setting values $G_0+\Delta G_{0.1}$, $G_0+\Delta G_{0.2}$, . . . , and $G_0+\Delta G_{tend}$ supplied from the setting value corrector 816 and the actual measurement value of the cylinder position of the first press cylinder 41a measured by the first magnescale 41c at each time. In addition, the cylinder position deviation calculator 817f calculates a deviation between the corrected press cylinder position setting values $G_0+\Delta G_{0.1}$, $G_0+\Delta G_{0.2}$, . . . , and $G_0+\Delta G_{tend}$ supplied from the setting value corrector 816 and the actual measurement value of the cylinder position of the second press cylinder 42a measured by the second magnescale 42c at each time.

The cylinder position deviation calculator 817f supplies the calculated cylinder position deviation of the first press cylinder 41a and the calculated cylinder position deviation of the second press cylinder 42a to the PID controller 817e. The PID controller 817e generates the pressure operation amount of the first press cylinder 41a and the pressure operation amount of the second press cylinder 42a, on the basis of the cylinder position deviation of the first press cylinder 41a and the cylinder position deviation of the second press cylinder 42a.

The PID controller 817e supplies the generated pressure operation amount of the first press cylinder 41a and the generated pressure operation amount of the second press cylinder 42a to the cylinder position controller 817d. The cylinder position controller 817d includes an actuator and drives each of the first press cylinder 41a and the second press cylinder 42a on the basis of the pressure operation amount of the first press cylinder 41a and the pressure operation amount of the second press cylinder 42a. Although acceleration is assumed in the above description, the same control is performed during deceleration.

It is necessary to consider a delay time (time lag $t_e$) from the change of the cylinder position setting value to the change of the actual cylinder position. Therefore, the line speed setting changer 819 supplies a command value for the line speed change to the line speed controller 8110 at timing delayed by a time corresponding to the time lag $t_e$ from timing at which a command to change the setting value of the cylinder position is given to the correction value calculator 815. As a result, the operation of the actuator can be more appropriately changed with respect to the change in the line speed, and the thickness of the electrode plate 2 can be corrected with high accuracy. As described above, it is desirable to use a highly responsive hydraulic servo valve for pressure control of the first press cylinder 41a and the second press cylinder 42a.

As described above, in the feedforward control example 2, the thickness change of the electrode plate 2 due to the change in the line speed is predicted, the press cylinder position necessary for maintaining the thickness of the electrode plate 2 constantly is calculated, and the press cylinder position is changed by feedforward control. As a result, the thickness change of the electrode plate 2 during the acceleration period or the deceleration period of the conveyance line can be suppressed with high accuracy.

Figure 12:
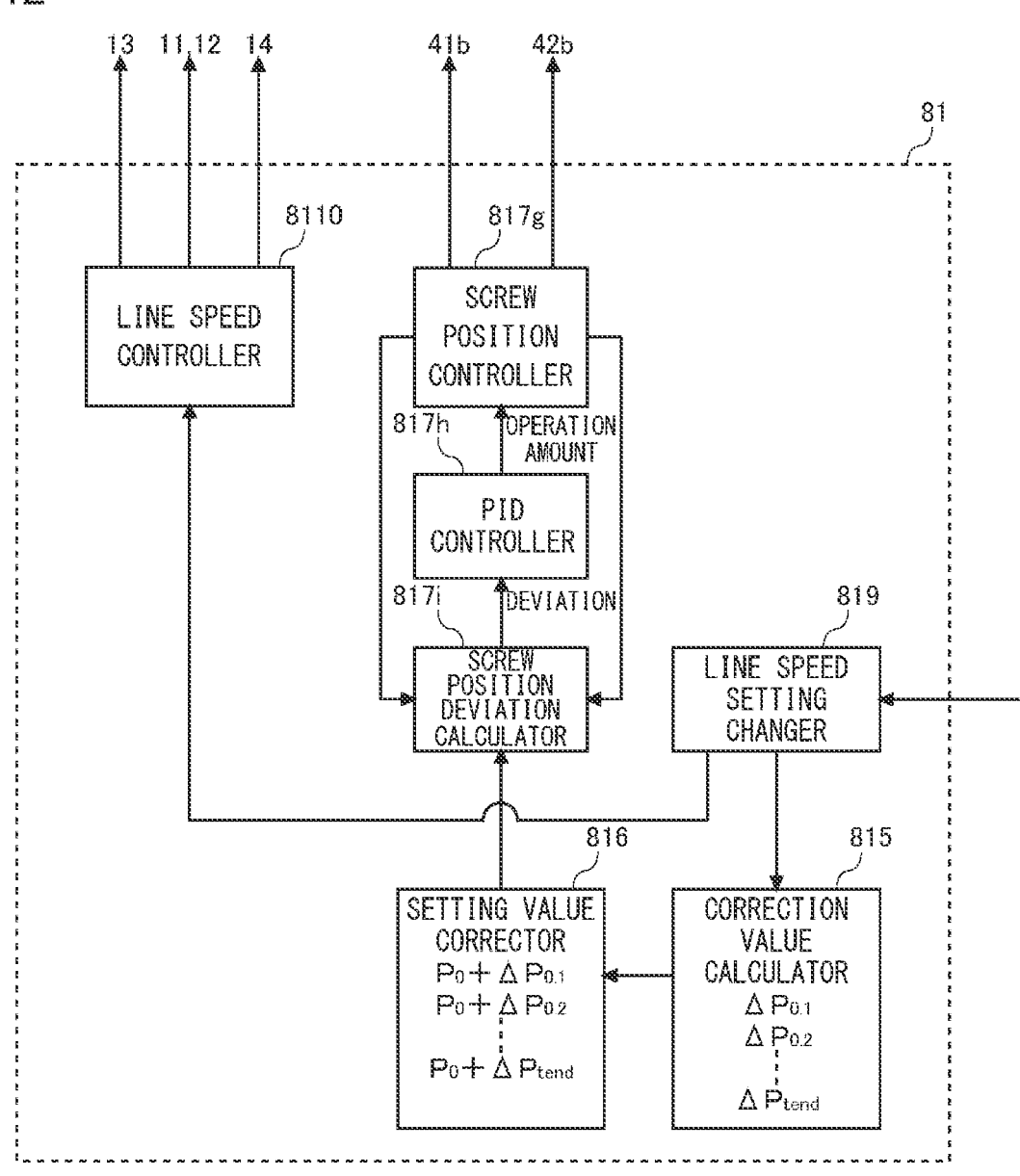
FIG. 12 is a diagram illustrating a feedforward control example 3 using the first control panel.

FIG. 12 is a diagram illustrating a feedforward control example 3 using the first control panel 81. The feedforward control example 3 is control used in the roll press device according to the first embodiment illustrated in FIG. 1. In the feedforward control example 3, the first electric screw 41b and the second electric screw 42b are used as the compression mechanism. Hereinafter, differences from the feedforward control example 1 illustrated in FIG. 10 will be described. In the feedforward control example 3, instead of the press pressure controller 817a, the PID controller 817b, and the press pressure deviation calculator 817c, a screw position controller 817g, a PID controller 817h, and a screw position deviation calculator 817i are provided.

In the feedforward control example 3, a sufficiently large pressure (fixed value) is applied to the first press cylinder 41a and the second press cylinder 42a to prevent the cylinder position from changing due to the position change of the first electric screw 41b and the second electric screw 42b. In this state, the press load acting on the electrode plate 2 is changed by changing the positions of the first electric screw 41b and the second electric screw 42b. The positions of the first electric screw 41b and the second electric screw 42b are controlled by the servomotor. Since there is a proportional relation between the change amount $\Delta D_{ave}$ of the average electric screw position $D_{ave}=(D_m+D_s)/2$ of the driving-side electric screw position $D_m$ and the operation-side electric screw position $D_s$ and the change amount $\Delta T_{ave}$ of the thickness average value $T_{ave}$ of the electrode plate 2, a relation of the following (Formula 34) holds between the change amount $\Delta D_{ave}$ of the average electric screw position $D_{ave}$ and the change amount $\Delta T_{ave}$ of the thickness average value $T_{ave}$ when the electric screw position is changed.

$$\Delta T_{ave}=H \times \Delta D_{ave} \tag{Formula 34}$$

H is a proportional constant.

The correction value $\Delta D_{ave,s}$ of the average electric screw position $D_{ave}$ for causing the change amount $\Delta T_{ave,s}$ of the thickness average value $T_{ave}$ after S seconds from the start of acceleration or deceleration to be zero can be obtained by the following (Formula 35) after removing $\Delta V_s$ and $\Delta T_{ave}$ from the relations of the above (Formula 26), (Formula 27), and (Formula 34).

$$\Delta D_{ave,s}=\{(D \times a)/H\} \times S \tag{Formula 35}$$

When the average electric screw position at the time of acceleration or deceleration is set to $D_{ave,0}$, the positions of the first electric screw 41b and the second electric screw 42b are feedforward-controlled such that the average electric screw position after S seconds becomes $D_{ave,0}+\Delta D_{ave,s}$. As a result, a change in the thickness of the electrode plate 2 due to a change in the line speed can be suppressed.

The difference between the driving-side electric screw position $D_m$ and the operation-side electric screw position $D_s$ in the acceleration period or the deceleration period of the conveyance line may be basically the same as that before the acceleration or the deceleration. Note that, when the thickness change of the electrode plate 2 due to the change in line speed is different between the driving side and the operation side due to the difference in rigidity between the driving side and the operation side of the roll press device 1, the difference during the acceleration period or the deceleration period may be changed.

The correction value calculator 815 is supplied with the acceleration start time, the acceleration end time, the line speed $V_0$ at the start of acceleration, and the acceleration $\alpha$ from the line speed setting changer 819, before the start of acceleration of the conveyance line. In addition, the correction value calculator 815 is supplied with the deceleration start time, the deceleration end time, the line speed $V_0$ at the start of deceleration, and the deceleration a from the line speed setting changer 819, before the start of deceleration of the conveyance line.

The correction value calculator 815 calculates a change amount $\Delta V_s$ of the line speed after S seconds from the start of the acceleration, on the basis of the above (Formula 26), the line speed $V_0$ at the start of the acceleration, and the acceleration $\alpha$. The correction value calculator 815 applies the calculated change amount $\Delta V_s$ of the line speed to the above (Formula 27) to predict the change amount $\Delta T_{ave,s}$ of the thickness average value $T_{ave}$ after S seconds from the start of acceleration. The correction value calculator 815 calculates a correction value $\Delta D_{ave,s}$ of the average electric screw position $D_{ave}$ for causing the change amount $\Delta T_{ave,s}$ of the thickness average value $T_{ave}$ to be zero, on the basis of the above (Formula 35).

In the example illustrated in FIG. 12, the correction value calculator 815 calculates the correction values $\Delta D_{0.1}$, $\Delta D_{0.2}$, . . . , and $\Delta D_{tend}$ of the average electric screw position $D_{ave}$ at intervals of 0.1 seconds, and supplies the calculated correction values $\Delta D_{0.1}$, $\Delta D_{0.2}$, . . . , and $\Delta D_{tend}$ of the average electric screw position $D_{ave}$ to the setting value corrector 816.

The setting value corrector 816 is supplied with the correction values $\Delta D_{0.1}$, $\Delta D_{0.2}$, . . . , and $\Delta D_{tend}$ of the average electric screw position $D_{ave}$ from the correction value calculator 815. The setting value corrector 816 adds the correction values $\Delta D_{0.1}$, $\Delta D_{0.2}$, . . . , and $\Delta D_{tend}$ to the electric screw position setting value $D_0$ at the start of acceleration to calculate corrected electric screw position setting values $D_0+\Delta D_{0.1}$, $D_0+\Delta D_{0.2}$, . . . , and $D_0+\Delta D_{tend}$. The electric screw position setting value $D_0$ at the start of acceleration is, for example, the electric screw position setting value D input by the operator via the HMI. The setting value corrector 816 supplies the calculated corrected electric screw position setting values $D_0+\Delta D_{0.1}$, $D_0+\Delta D_{0.2}$, . . . , and $D_0+\Delta D_{tend}$ to the screw position deviation calculator 817i.

The screw position deviation calculator 817i calculates a deviation between the corrected electric screw position setting values $D_0+\Delta D_{0.1}$, $D_0+\Delta D_{0.2}$, . . . , and $D_0+\Delta D_{tend}$ supplied from the setting value corrector 816 and the measurement value of the position of the first electric screw 41b at each time. In addition, the screw position deviation calculator 817i calculates a deviation between the corrected electric screw position setting values $D_0+\Delta D_{0.1}$, $D_0+\Delta D_{0.2}$, . . . , and $D_0+\Delta D_{tend}$ supplied from the setting value corrector 816 and the measurement value of the position of the second electric screw 42b at each time.

The screw position controller 817g includes servo motors for reducing the pressures of the first electric screw 41b and the second electric screw 42b, respectively. A position change amount of each of the first electric screw 41b and the second electric screw 42b can be calculated from the rotation speed of each servomotor.

The screw position deviation calculator 817i supplies the calculated position deviation of the first electric screw 41b and the calculated position deviation of the second electric screw 42b to the PID controller 817h. The PID controller 817h generates a rotation operation amount of the servomotor for the first electric screw 41b and a rotation operation amount of the servomotor for the second electric screw 42b, on the basis of the position deviation of the first electric screw 41b and the position deviation of the second electric screw 42b.

The PID controller 817h supplies the generated rotation operation amount of the servomotor for the first electric screw 41b and the generated rotation operation amount of the servomotor for the second electric screw 42b to the screw position controller 817g. The screw position controller 817g drives each of the servomotor for the first electric screw 41b and the servomotor for the second electric screw 42b, on the basis of the rotation operation amount of the servomotor for the first electric screw 41b and the rotation operation amount of the servomotor for the second electric screw 42b. Although acceleration is assumed in the above description, the same control is performed during deceleration.

It is necessary to consider a delay time (time lag $t_e$) from the change of the electric screw position setting value to the change of the actual electric screw position. Therefore, the line speed setting changer 819 supplies a command value for the line speed change to the line speed controller 8110 at timing delayed by a time corresponding to the time lag $t_e$ from timing at which a command to change the setting value of the electric crew position is given to the correction value calculator 815. As a result, the operation of the servo motor can be more appropriately changed with respect to the change in the line speed, and the thickness of the electrode plate 2 can be corrected with high accuracy.

As described above, in the feedforward control example 3, the thickness change of the electrode plate 2 due to the change in the line speed is predicted, the electric screw position necessary for maintaining the thickness of the electrode plate 2 constantly is calculated, and the electric screw position is changed by feedforward control. As a result, the thickness change of the electrode plate 2 during the acceleration period or the deceleration period of the conveyance line can be suppressed with high accuracy.

As described above, according to the feedback control examples 1 to 4 using the roll press devices 1 according to the first to third embodiments, the first feature amount $T_{t-m}$, the second feature amount $T_{t-s}$, and the third feature amount $T_{drop}$ are calculated on the basis of the driving-side thickness measurement value $T_m$, the center thickness measurement value $T_c$, the operation-side thickness measurement value $T_s$, and the thickness target value $T_t$, and the compression mechanism and/or the bend mechanism is controlled such that all of the first feature amount $T_{t-m}$, the second feature amount $T_{t-s}$, and the third feature amount $T_{drop}$ become zero. As the compression mechanism, the press mechanism or the cotter mechanism can be used. As a result, the thickness of the electrode plate 2 after the compression processing can converged to the target value $T_t$ over the entire width.

The above Patent Literature 1 (JP 2013-111647 A) discloses a method for measuring the thicknesses after compression at the three positions of the operation side, the center portion, and the driving side, and controlling the press mechanism and the bend mechanism such that a difference between the measured thickness value and the target thickness falls within the preset threshold when the difference falls outside the threshold. In this method, since the film thickness control is not activated until the film thickness exceeds the threshold, thickness accuracy of the threshold or more cannot be obtained, and it may take time to converge to the vicinity of the target thickness or it may not be possible to converge to the vicinity of the target thickness.

In the above method, the driving-side thickness, the operation-side thickness, and the target thickness are compared, and when at least one of the driving-side thickness or the operation-side thickness exceeds the threshold, the position of the press cylinder is reset so as to correct the thickness, and the pressure of the bend cylinder is calculated and set to maintain the deflection correction amount that changes due to the position change of the press cylinder. When both the driving-side thickness and the operation-side thickness do not exceed the threshold, the center portion thickness is compared with the threshold. When the center portion thickness exceeds the threshold, it is determined that the roll deformation of the center portion is large, and only the pressure of the bend cylinder is changed and the position of the press cylinder is not changed. This control flow is repeatedly executed.

In general, the pressure change of the bend cylinder acts in a direction of opening the roll gap, and changes the rolling load on the material to be rolled, so that the thickness change is involved. Therefore, even in any procedure in the control flow, the film thickness is changed by changing the pressure of the bend cylinder, and the film thickness deviates again from the threshold, so that it takes time to reach the vicinity of the target thickness, or the film thickness cannot be controlled to the threshold in some cases. In particular, when the threshold decreases or when the position of the press cylinder or the pressure of the bend cylinder needs to be greatly changed, the possibility that the film thickness deviates again from the threshold increases, so that there is a limit to the thickness range or the control speed that can be controlled.

As described above, the driving-side thickness, the operation-side thickness, and the target thickness are compared, and when both the driving-side thickness and the operation-side thickness do not exceed the threshold, the center portion thickness and the threshold are compared. When the center portion thickness exceeds the threshold, it is determined that the roll deflection is large, and only the pressure of the bend cylinder is changed. In this case, since the center thickness is controlled after the thicknesses of both ends are controlled to the threshold or less, it takes time to converge to the target thickness. Furthermore, in the course of controlling the thicknesses of both ends, the center thickness may deviate from the target thickness. For example, when the center thickness is larger than the target thickness and the thicknesses of both ends are smaller than the target thickness, the loads of both sides are controlled to be lowered such that the thicknesses of both ends become the target thickness. However, since the pressure from the press roll acting on the center portion of the electrode plate also decreases, the center thickness increases and deviates from the target value.

On the other hand, according to the feedback control examples 1 to 4 using the roll press devices 1 according to the first to third embodiments, the magnitude of the roll deflection and the direction of the roll deflection are determined by the difference (third feature amount $T_{drop}$) between the center thickness and the average of the both end thicknesses, and the difference between the center thickness and the both end thicknesses due to the roll deflection is simultaneously controlled while the both end thicknesses are controlled. As a result, it is possible to more quickly converge the thickness of the electrode plate 2 to the target value over the entire width without deteriorating the thickness in the width direction.

As described above, according to the feedback control examples 1 to 4 using the roll press devices 1 according to the first to third embodiments, the feedback control is performed such that the thickness of the electrode plate 2 after the compression processing always converges to the target value $T_t$. As a result, the thickness of the electrode plate 2 is always maintained in a favorable state. In addition, since the thickness of the electrode plate 2 is automatically controlled to the target value $T_t$, it is not necessary for the operator to stop the line periodically, measure the thickness of the electrode plate 2 with a micrometer, and adjust the pressure value of the compression mechanism and/or the bend mechanism on the basis of the measurement value. Therefore, it is not necessary to deploy a skilled operator, and labor costs can be suppressed. Further, it is possible to suppress variations in quality caused by the operator.

In addition, according to the feedback control examples 1 to 4 using the roll press devices 1 according to the first to third embodiments, in order to prevent execution of correction of a new setting value on the basis of the thickness measurement value before the correction of the setting value is reflected, the time $t_d$ required to reach a state where the length of the electrode plate 2 reaches the pass line length $L_t$ from the press position to the thickness meter 70 and the correction of the setting value is reflected in the thickness measurement value after execution of the correction of the setting value elapses and then the thickness measurement value is acquired. The three feature amounts are calculated on the basis of the acquired thickness measurement value, the correction value is calculated on the basis of the three feature amounts, and the next setting value change is executed.

In the coating step or the drying step in the pre-pressing step, the thickness of the material to be rolled after pressing may change due to a change in the thickness of the coating film of the material to be rolled, a change in the hardness of the coating film, or a thermal influence of the pressure roller or the main bearing. Even in this case, by repeatedly and continuously performing the above control, immediately after the thickness meter 70 detects the thickness change, the thickness of the material to be rolled after pressing can be controlled to the target value $T_t$ in the entire width, so that the good thickness can be obtained over the entire length.

Further, by using the feedforward control examples 1 to 3 in combination, the thickness change of the electrode plate 2 at the time of acceleration or deceleration of the conveyance line can be suppressed with high accuracy. That is, by predicting the thickness change of the electrode plate 2 due to the change in the line speed, calculating the compression condition for causing the predicted thickness change to be zero, and feedforward-controlling the compression mechanism, the thickness change due to the change in the line speed can be suppressed with high accuracy.

Since each proportional constant described above varies depending on the product type of the material to be rolled, it is desirable to measure the proportional constant for each product type.

The present disclosure has been described on the basis of the embodiments. The embodiments are merely examples, and it is understood by those skilled in the art that various modifications can be made in the combination of the respective components or the respective processing processes, and that the modifications are also within the scope of the present disclosure.

In FIG. 3, an example has been described in which the control device 80 includes the two control panels of the first control panel 81 and the second control panel 82. However, the control device 80 may include one control panel in which the first control panel 81 and the second control panel 82 are integrated.

In addition, in the above-described first to third embodiments, an example has been described in which the compression mechanism and/or the bend mechanism is controlled such that all of the first feature amount $T_{t-m}$, the second feature amount $T_{t-s}$, and the third feature amount $T_{drop}$ become zero. A state in which the third feature amount $T_{drop}$ is zero and the difference between the driving-side thickness measurement value $T_m$ and the operation-side thickness measurement value $T_s$ is also zero is a state in which the electrode plate 2 is flat in the width direction. In this regard, in the case of manufacturing the electrode plate 2 in which both edges are thicker than the center, the compression mechanism and/or the bend mechanism is controlled such that the third feature amount $T_{drop}$ has a negative value corresponding to the thickness difference between the edge and the center. In the case of manufacturing the electrode plate 2 in which both edges are thinner than the center, the compression mechanism and/or the bend mechanism is controlled such that the third feature amount $T_{drop}$ has a positive value corresponding to the thickness difference between the edge and the center.

That is, the electrode plate 2 having an arbitrary thickness profile can be manufactured by arbitrarily setting β, γ, and δ in the following (Formula 35) to (Formula 37).

$$T_{t-m}+\beta=0 \qquad \text{(Formula 35)}$$

$$T_{t-s}+\gamma=0 \qquad \text{(Formula 36)}$$

$$T_{drop}+\delta=0 \qquad \text{(Formula 37)}$$

β, γ, and δ are arbitrary real numbers [μm].

In the first to third embodiments described above, the third feature amount indicating the secondary component of the thickness profile of the electrode plate is defined by the difference between the center thickness measurement value $T_c$ and the average value of the driving-side thickness measurement value $T_m$ and the operation-side thickness measurement value $T_s$. In this regard, the third feature amount can also be defined from a quadratic or quaternary approximate curve derived using the least squares method on the basis of the thickness measurement values at three or more points. When the quadratic curve is approximated, the feature amount calculator 814 sets a quadratic coefficient of the approximated quadratic curve to the third feature amount. When the quaternary curve is approximated, the feature amount calculator 814 sets a quadratic coefficient of the approximated quaternary curve to the third feature amount. In general, when the number of sample points increases, the approximation accuracy is improved. In addition, a quadratic coefficient can be derived if the function is a quadratic or higher function.

When thickness measurement values at five or more points are acquired, the first feature amount $T_{t-m}$ is defined by a deviation between the thickness target value $T_t$ and the thickness measurement value $T_m$ at the most driving-side point among the five or more points, and the second feature amount $T_{t-s}$ is defined by a deviation between the thickness target value $T_t$ and the thickness measurement value $T_s$ at the most operation-side point among the five or more points.

Note that the embodiments may be specified by the following items.

[Item 1]

A roll press device (1) comprising:

a first pressure roller (11) and a second pressure roller (12) structured to roll an electrode plate (2) of a secondary battery to be continuously conveyed by sandwiching the electrode plate (2);

a first main bearing (21) and a second main bearing (22) provided on one side and the other side of a rotation shaft of the first pressure roller (11), respectively, and structured to rotatably support the rotation shaft;

a third main bearing (23) and a fourth main bearing (24) provided on one side and the other side of a rotation shaft of the second pressure roller (12), respectively, and structured to rotatably support the rotation shaft;

a first bend bearing (31) and a second bend bearing (32) provided on one side and the other side of the rotation shaft of the first pressure roller (11), respectively, and structured to rotatably support the rotation shaft;

a third bend bearing (33) and a fourth main bearing (24) provided on one side and the other side of the rotation shaft of the second pressure roller (12), respectively, and structured to rotatably support the rotation shaft;

a first compression mechanism (41) capable of applying a load to at least one of the first main bearing (21) and the third main bearing (23) in a direction in which the first pressure roller (11) and the second pressure roller (12) approach each other;

a second compression mechanism (42) capable of applying a load to at least one of the second main bearing (22) and the fourth bend bearing (34) in a direction in which the first pressure roller (11) and the second pressure roller (12) approach each other;

a first bend mechanism (51) capable of applying a load to at least one of the first bend bearing (31) and the third bend bearing (33) in a direction in which the first pressure roller (11) and the second pressure roller (12) are separated from each other;

a second bend mechanism (52) capable of applying a load to at least one of the second bend bearing (32) and the fourth bend bearing (34) in a direction in which the first pressure roller (11) and the second pressure roller (12) are separated from each other;

a thickness meter (70) provided on the exit side of the first pressure roller (11) and the second pressure roller (12) and structured to detect a thickness of the electrode plate (2) of the secondary battery at three or more points in a width direction of the electrode plate (2);

a calculator (814 to 816) structured to calculate setting values of the first compression mechanism (41), the second compression mechanism (42), the first bend mechanism (51), and the second bend mechanism (52) on the basis of thickness measurement values at the three or more points based on detection values of the thickness meter (70) and a thickness target value; and a controller (817, 818) structured to control loads of the first compression mechanism (41), the second compression mechanism (42), the first bend mechanism (51), and the second bend mechanism (52) on the basis of the setting values calculated by the calculator (814 to 816), wherein the calculator (814 to 816) calculates three feature amounts of a first deviation between the thickness target value and a thickness measurement value of a point closest to the first compression mechanism (41) among the three or more points, a second deviation between the thickness target value and a thickness measurement value of a point closest to the second compression mechanism (42) among the three or more points, and a secondary component of a thickness profile of the electrode plate (2), and adaptively changes the setting values of the first compression mechanism (41), the second compression mechanism (42), the first bend mechanism (51), and the second bend mechanism (52) on the basis of the three feature amounts.

According to this, it is possible to realize high accuracy of thickness control of the electrode plate (2) by the roll press device (1).

[Item 2]

The roll press device (1) according to item 1, wherein the thickness meter (70) is provided on the exit side of the first pressure roller (11) and the second pressure roller (12), and detects the thickness of the electrode plate (2) of the secondary battery at each of a first point, a second point, and a third point arranged in the width direction of the electrode plate (2), the calculator (814 to 816) calculates setting values of the first compression mechanism (41), the second compression mechanism (42), the first bend mechanism (51), and the second bend mechanism (52) on the basis of a first point thickness measurement value, a second point thickness measurement value, and a third point thickness measurement value based on detection values of the thickness meter (70) and the thickness target value, the first point is set to an end portion of the electrode plate (2) of the secondary battery on the side where the first compression mechanism (41) is provided, the second point is set to a center portion of the electrode plate (2) of the secondary battery, the third point is set to an end portion of the electrode plate (2) of the secondary battery on the side where the second compression mechanism (42) is provided, the calculator (814 to 816) calculates three feature amounts of a first deviation between the first point thickness measurement value and the thickness target value, a second deviation between the third point thickness measurement value and the thickness target value, and a secondary component of a thickness profile of the electrode plate (2) from the first point thickness measurement value, the second point thickness measurement value, the third point thickness measurement value, and the thickness target value, and the secondary component of the thickness profile of the electrode plate (2) is defined by a difference between the second point thickness measurement value and an average value of the first point thickness measurement value and the third point thickness measurement value.

According to this, the thickness of the electrode plate (2) in the width direction can be profiled with high accuracy by the three feature amounts calculated from the thickness measurement values at the three points.

[Item 3]

The roll press device (1) according to item 1 or 2, wherein the calculator (814 to 816) calculates setting values of the first compression mechanism (41), the second compression mechanism (42), the first bend mechanism (51), and the second bend mechanism (52) such that all of the three feature amounts become zero, on the basis of a relation between a load generated by the first compression mechanism (41), the second compression mechanism (42), the first bend mechanism (51), and the second bend mechanism (52) and the three feature amounts, which is derived in advance.

According to this, the thickness change of the electrode plate (2) can be suppressed with high accuracy by feedback control using the three feature amounts.

[Item 4]

The roll press device (1) according to item 3, wherein the first compression mechanism (41) includes a first press cylinder (41a), the second compression mechanism (42) includes a second press cylinder (42a), the first bend mechanism (51) includes a first bend cylinder (51a or 51b, 51c), the second bend mechanism (52) includes a second bend cylinder (52a or 52b, 52c), and the calculator (814 to 816) calculates setting values of a pressure of the first press cylinder (41a), a pressure of the second press cylinder (42a), a pressure of the first bend cylinder (51a or 51b, 51c), and a pressure of the second bend cylinder (52a or 52b, 52c) such that all of the three feature amounts become zero.

According to this, by feedback-controlling the setting values of the pressure of the first press cylinder (41a), the pressure of the second press cylinder (42a), the pressure of the first bend cylinder (51a or 51b, 51c), and the pressure of the second bend cylinder (52a or 52b, 52c) using the three feature amounts, the thickness change of the electrode plate (2) can be suppressed with high accuracy.

[Item 5]

The roll press device (1) according to item 3, wherein the first compression mechanism (41) includes a first press cylinder (41a), the second compression mechanism (42) includes a second press cylinder (42a), the first bend mechanism (51) includes a first bend cylinder (51a or 51b, 51c), the second bend mechanism (52) includes a second bend cylinder (52a or 52b, 52c), and the calculator (814 to 816) calculates setting values of a position of the first press cylinder (41a), a position of the second press cylinder (42a), a pressure of the first bend cylinder (51a or 51b, 51c), and a pressure of the second bend cylinder (52a or 52b, 52c) such that all of the three feature amounts become zero.

According to this, by feedback-controlling the setting values of the position of the first press cylinder (41a), the position of the second press cylinder (42a), the pressure of the first bend cylinder (51a or 51b, 51c), and the pressure of the second bend cylinder (52a or 52b, 52c) using the three feature amounts, the thickness change of the electrode plate (2) can be suppressed with high accuracy.

[Item 6]

The roll press device (1) according to item 5, wherein the first compression mechanism (41) further includes a first magnescale (41c) to measure a position of the first press cylinder (41a), the second compression mechanism (42) further includes
a second magnescale (42*c*) to measure a position of the
second press cylinder (42*a*), and
the controller (817*d*, 818)
controls the pressure of the first press cylinder (41*a*) such
that the position of the first press cylinder (41*a*) mea-
sured by the first magnescale (41*c*) and the position of
the first press cylinder (41*a*) supplied from the calcu-
lator (814 to 816) are matched with each other, and
controls the pressure of the second press cylinder (42*a*)
such that the position of the second press cylinder (42*a*)
measured by the second magnescale (42*c*) and the
position of the second press cylinder (42*a*) supplied
from the calculator (814 to 816) are matched with each
other.

According to this, the position of the first press cylinder
(41*a*) and the position of the second press cylinder (42*a*) can
be measured with high accuracy using the first magnescale
(41*c*) and the second magnescale (42*c*), and feedback con-
trol of the compression mechanism with high responsiveness
can be realized.

[Item 7]
The roll press device (1) according to item 3, wherein
the first compression mechanism (41) includes a first
electric screw (41*b*),
the second compression mechanism (42) includes a sec-
ond electric screw (42*b*),
the first bend mechanism (51) includes a first bend
cylinder (51*a* or 51*b*, 51*c*),
the second bend mechanism (52) includes a second bend
cylinder (52*a* or 52*b*, 52*c*), and
the calculator (814 to 816) calculates setting values of a
position of the first electric screw (41*b*), a position of
the second electric screw (42*b*), a pressure of the first
bend cylinder (51*a* or 51*b*, 51*c*), and a pressure of the
second bend cylinder (52*a* or 52*b*, 52*c*) such that all of
the three feature amounts become zero.

According to this, by feedback-controlling the setting
values of the position of the first electric screw (41*b*), the
position of the second electric screw (42*b*), the pressure of
the first bend cylinder (51*a* or 51*b*, 51*c*), and the pressure of
the second bend cylinder (52*a* or 52*b*, 52*c*) using the three
feature amounts, the thickness change of the electrode plate
(2) can be suppressed with high accuracy.

[Item 8]
The roll press device (1) according to item 3, wherein
the first compression mechanism (41) includes a first
electric cotter (41*e*),
the second compression mechanism (42) includes a sec-
ond electric cotter (42*e*),
the first bend mechanism (51) includes a first bend
cylinder (51*a* or 51*b*, 51*c*),
the second bend mechanism (52) includes a second bend
cylinder (52*a* or 52*b*, 52*c*), and
the calculator (814 to 816) calculates setting values of a
height of the first electric cotter (41*e*), a height of the
second electric cotter (42*e*), a pressure of the first bend
cylinder (51*a* or 51*b*, 51*c*), and a pressure of the second
bend cylinder (52*a* or 52*b*, 52*c*) such that all of the three
feature amounts become zero.

According to this, by feedback-controlling the height of
the first electric cotter (41*e*), the height of the second electric
cotter (42*e*), the pressure of the first bend cylinder (51*a* or
51*b*, 51*c*), and the pressure of the second bend cylinder (52*a*
or 52*b*, 52*c*) using the three feature amounts, the thickness
change of the electrode plate (2) can be suppressed with high
accuracy.

[Item 9]
The roll press device (1) according to any one of items 1
to 8, wherein
the thickness meter (70) continuously detects a thickness
of the electrode plate (2) by scanning one thickness
detection sensor in a width direction of the electrode
plate (2), and extracts thickness detection values at the
three or more points.

According to this, the number of thickness detection
sensors can be reduced.

[Item 10]
The roll press device (1) according to any one of items 1
to 8, wherein
the thickness meter (70) detects thicknesses at the three or
more points with three or more thickness detection
sensors.

According to this, the control of each thickness detection
sensor can be simplified.

[Item 11]
The roll press device (1) according to item 9 or 10, further
comprising:
a thickness measurement value calculator (821) structured
to calculate thickness measurement values at the three
or more points by filtering the three or more thickness
detection values detected by the thickness meter (70) in
a longitudinal direction of the electrode plate (2).

According to this, the noise of the detection value can be
removed.

[Item 12]
The roll press device (1) according to any one of items 1
to 8, wherein
the calculator (814 to 816) suspends a next change of the
setting values of the first compression mechanism (41),
the second compression mechanism (42), the first bend
mechanism (51), and the second bend mechanism (52)
until predetermined conditions regarding a pass line
length from a press position to the thickness meter (70)
and a reflection time of the changing of the setting
values in an actual output after changing the setting
values of the first compression mechanism (41), the
second compression mechanism (42), the first bend
mechanism (51), and the second bend mechanism (52)
are satisfied.

According to this, useless or excessive changes of the
setting value of the compression mechanism and/or the bend
mechanism can be avoided.

[Item 13]
A control device (80) used in a roll press device (1), which
includes
a first pressure roller (11) and a second pressure roller (12)
rolling an electrode plate (2) of a secondary battery to
be continuously conveyed by sandwiching the elec-
trode plate (2);
a first main bearing (21) and a second main bearing (22)
provided on one side and the other side of a rotation
shaft of the first pressure roller (11), respectively, and
rotatably supporting the rotation shaft;
a third main bearing (23) and a fourth main bearing (24)
provided on one side and the other side of a rotation
shaft of the second pressure roller (12), respectively,
and rotatably supporting the rotation shaft; a first bend
bearing (31) and a second bend bearing (32) provided
on one side and the other side of the rotation shaft of the
first pressure roller (11), respectively, and rotatably
supporting the rotation shaft;
a third bend bearing (33) and a fourth main bearing (24)
provided on one side and the other side of the rotation shaft of the second pressure roller (12), respectively, and rotatably supporting the rotation shaft;

a first compression mechanism (41) capable of applying a load to at least one of the first main bearing (21) and the third main bearing (23) in a direction in which the first pressure roller (11) and the second pressure roller (12) approach each other;

a second compression mechanism (42) capable of applying a load to at least one of the second main bearing (22) and the fourth bend bearing (34) in a direction in which the first pressure roller (11) and the second pressure roller (12) approach each other;

a first bend mechanism (51) capable of applying a load to at least one of the first bend bearing (31) and the third bend bearing (33) in a direction in which the first pressure roller (11) and the second pressure roller (12) are separated from each other;

a second bend mechanism (52) capable of applying a load to at least one of the second bend bearing (32) and the fourth bend bearing (34) in a direction in which the first pressure roller (11) and the second pressure roller (12) are separated from each other; and a thickness meter (70) provided on the exit side of the first pressure roller (11) and the second pressure roller (12) and detecting a thickness of the electrode plate (2) of the secondary battery at three or more points in a width direction of the electrode plate (2), the control device (80) comprising:

a calculator (814 to 816) structured to calculate setting values of the first compression mechanism (41), the second compression mechanism (42), the first bend mechanism (51), and the second bend mechanism (52) on the basis of thickness measurement values at the three or more points based on detection values of the thickness meter (70) and a thickness target value; and a controller (817, 818) structured to control loads of the first compression mechanism (41), the second compression mechanism (42), the first bend mechanism (51), and the second bend mechanism (52) on the basis of the setting values calculated by the calculator (814 to 816), wherein the calculator (814 to 816) calculates three feature amounts of a first deviation between the thickness target value and a thickness measurement value of a point closest to the first compression mechanism (41) among the three or more points, a second deviation between the thickness target value and a thickness measurement value of a point closest to the second compression mechanism (42) among the three or more points, and a secondary component of a thickness profile of the electrode plate (2), and adaptively changes the setting values of the first compression mechanism (41), the second compression mechanism (42), the first bend mechanism (51), and the second bend mechanism (52) on the basis of the three feature amounts.

According to this, it is possible to realize high accuracy of thickness control of the electrode plate (2) by the roll press device (1).

REFERENCE SIGNS LIST 1 roll press device, 2 electrode plate, 11 first pressure roller, 12 second pressure roller, 13 unwinder, 14 winder, 15 motor, 16 pulse generator, 21 to 24 main bearing, 31 to 34 bend bearing, 41 first compression mechanism, 42 second compression mechanism, 41a first press cylinder, 41b first electric screw, 41c first magnescale, 41d first load cell, 41e first electric cotter, 42a second press cylinder, 42b second electric screw, 42c second magnescale, 42d second load cell, 42e second electric cotter, 51 first bend mechanism, 51a first bend cylinder, 51b third bend cylinder, 51c fifth bend cylinder, 52a second bend cylinder, 52b fourth bend cylinder, 52c sixth bend cylinder, 52 second bend mechanism, 61 first preload mechanism, 61a first preload cylinder, 62 second preload mechanism, 62a second preload cylinder, 70 thickness meter, 80 control device, 81 first control panel, 811 length measurer, 812 acquisition timing generator, 813 thickness measurement value acquirer, 814 feature amount calculator, 815 correction value calculator, 816 setting value corrector, 817a press pressure controller, 817b PID controller, 817c press pressure deviation calculator, 817d cylinder position controller, 817e PID controller, 817f cylinder position deviation calculator, 817g screw position controller, 817h PID controller, 817i screw position deviation calculator, 817j cotter height controller, 817k PID controller, 8171 cotter height deviation calculator, 818a bend pressure controller, 818b PID controller, 818c bend pressure deviation calculator, 819 line speed setting changer, 8110 line speed controller

The invention claimed is:

1. A roll press device comprising:

a first pressure roller and a second pressure roller structured to roll an electrode plate of a secondary battery to be continuously conveyed by sandwiching the electrode plate;

a first main bearing and a second main bearing provided on one side and the other side of a rotation shaft of the first pressure roller, respectively, and structured to rotatably support the rotation shaft;

a third main bearing and a fourth main bearing provided on one side and the other side of a rotation shaft of the second pressure roller, respectively, and structured to rotatably support the rotation shaft;

a first bend bearing and a second bend bearing provided on one side and the other side of the rotation shaft of the first pressure roller, respectively, and structured to rotatably support the rotation shaft;

a third bend bearing and a fourth bend bearing provided on one side and the other side of the rotation shaft of the second pressure roller, respectively, and structured to rotatably support the rotation shaft;

a first compression mechanism capable of applying a load to at least one of the first main bearing and the third main bearing in a direction in which the first pressure roller and the second pressure roller approach each other;

a second compression mechanism capable of applying a load to at least one of the second main bearing and the fourth main bearing in a direction in which the first pressure roller and the second pressure roller approach each other;

a first bend mechanism capable of applying a load to at least one of the first bend bearing and the third bend bearing in a direction in which the first pressure roller and the second pressure roller are separated from each other;

a second bend mechanism capable of applying a load to at least one of the second bend bearing and the fourth bend bearing in a direction in which the first pressure roller and the second pressure roller are separated from each other;

a thickness meter provided on an exit side of the first pressure roller and the second pressure roller and structured to detect a thickness of the electrode plate of the secondary battery at three or more points in a width direction of the electrode plate, wherein the thickness meter detects the thickness of the electrode plate of the secondary battery at each of a first point, a second point, and a third point arranged in the width direction of the electrode plate;

a calculator structured to calculate setting values of the first compression mechanism, the second compression mechanism, the first bend mechanism, and the second bend mechanism on the basis of a first point thickness measurement value at the first point, a second point thickness measurement value at the second point, and a third point thickness measurement value at the third point based on detection values of the thickness meter and a thickness target value, wherein the first point is set to an end portion of the electrode plate of the secondary battery on the side where the first compression mechanism is provided, the second point is set to a center portion of the electrode plate of the secondary battery, and the third point is set to an end portion of the electrode plate of the secondary battery on the side where the second compression mechanism is provided; and a controller structured to control loads of the first compression mechanism, the second compression mechanism, the first bend mechanism, and the second bend mechanism on the basis of the setting values calculated by the calculator, wherein the calculator calculates three feature amounts of a first deviation between the thickness target value and a thickness measurement value of a point closest to the first compression mechanism among the three or more points, a second deviation between the thickness target value and a thickness measurement value of a point closest to the second compression mechanism among the three or more points, and a secondary component of a thickness profile of the electrode plate, and adaptively changes the setting values of the first compression mechanism, the second compression mechanism, the first bend mechanism, and the second bend mechanism on the basis of the three feature amounts, the calculator calculates the three feature amounts of the first deviation between the first point thickness measurement value and the thickness target value, the second deviation between the third point thickness measurement value and the thickness target value, and the secondary component of the thickness profile of the electrode plate from the first point thickness measurement value, the second point thickness measurement value, the third point thickness measurement value, and the thickness target value, and the secondary component of the thickness profile of the electrode plate is defined by a difference between the second point thickness measurement value and an average value of the first point thickness measurement value and the third point thickness measurement value.

2. The roll press device according to claim 1, wherein the calculator calculates the setting values of the first compression mechanism, the second compression mechanism, the first bend mechanism, and the second bend mechanism such that all of the three feature amounts become zero, on the basis of a relation between a load generated by the first compression mechanism, the second compression mechanism, the first bend mechanism, and the second bend mechanism and the three feature amounts, which is derived in advance.

3. The roll press device according to claim 2, wherein the first compression mechanism includes a first press cylinder, the second compression mechanism includes a second press cylinder, the first bend mechanism includes a first bend cylinder, the second bend mechanism includes a second bend cylinder, and the calculator calculates setting values of a pressure of the first press cylinder, a pressure of the second press cylinder, a pressure of the first bend cylinder, and a pressure of the second bend cylinder such that all of the three feature amounts become zero.

4. The roll press device according to claim 2, wherein the first compression mechanism includes a first press cylinder, the second compression mechanism includes a second press cylinder, the first bend mechanism includes a first bend cylinder, the second bend mechanism includes a second bend cylinder, and the calculator calculates setting values of a position of the first press cylinder, a position of the second press cylinder, a pressure of the first bend cylinder, and a pressure of the second bend cylinder such that all of the three feature amounts become zero.

5. The roll press device according to claim 4, wherein the first compression mechanism further includes a first magnescale to measure a position of the first press cylinder, the second compression mechanism further includes a second magnescale to measure a position of the second press cylinder, and the controller controls the position of the first press cylinder such that the position of the first press cylinder measured by the first magnescale and the position of the first press cylinder supplied from the calculator are matched with each other, and controls the position of the second press cylinder such that the position of the second press cylinder measured by the second magnescale and the position of the second press cylinder supplied from the calculator are matched with each other.

6. The roll press device according to claim 2, wherein the first compression mechanism includes a first electric screw, the second compression mechanism includes a second electric screw, the first bend mechanism includes a first bend cylinder, the second bend mechanism includes a second bend cylinder, and the calculator calculates setting values of a position of the first electric screw, a position of the second electric screw, a pressure of the first bend cylinder, and a pressure of the second bend cylinder such that all of the three feature amounts become zero.

7. The roll press device according to claim 2, wherein the first compression mechanism includes a first wedge structure, the second compression mechanism includes a second wedge structure, the first bend mechanism includes a first bend cylinder, the second bend mechanism includes a second bend cylinder, and the calculator calculates setting values of a height of the first wedge structure, a height of the second wedge structure, a pressure of the first bend cylinder, and a pressure of the second bend cylinder such that all of the three feature amounts become zero.

8. The roll press device according to claim 1, wherein the thickness meter continuously detects the thickness of the electrode plate by scanning one thickness detection sensor in the width direction of the electrode plate, and extracts thickness detection values at the three or more points.

9. The roll press device according to claim 8, further comprising:

a thickness measurement value calculator structured to calculate thickness measurement values at the three or more points by filtering the three or more thickness detection values detected by the thickness meter in a longitudinal direction of the electrode plate.

10. The roll press device according to claim 1, wherein the thickness meter detects thicknesses at the three or more points with three or more thickness detection sensors.

11. The roll press device according to claim 1, wherein the calculator suspends a next change of the setting values of the first compression mechanism, the second compression mechanism, the first bend mechanism, and the second bend mechanism until predetermined conditions regarding a pass line length from a press position to the thickness meter and a reflection time of the changing of the setting values in an actual output after changing the setting values of the first compression mechanism, the second compression mechanism, the first bend mechanism, and the second bend mechanism are satisfied.

12. A control device used in a roll press device, which includes:

a first pressure roller and a second pressure roller rolling an electrode plate of a secondary battery to be continuously conveyed by sandwiching the electrode plate;

a first main bearing and a second main bearing provided on one side and the other side of a rotation shaft of the first pressure roller, respectively, and rotatably supporting the rotation shaft;

a third main bearing and a fourth main bearing provided on one side and the other side of a rotation shaft of the second pressure roller, respectively, and rotatably supporting the rotation shaft;

a first bend bearing and a second bend bearing provided on one side and the other side of the rotation shaft of the first pressure roller, respectively, and rotatably supporting the rotation shaft;

a third bend bearing and a fourth bend bearing provided on one side and the other side of the rotation shaft of the second pressure roller, respectively, and rotatably supporting the rotation shaft;

a first compression mechanism capable of applying a load to at least one of the first main bearing and the third main bearing in a direction in which the first pressure roller and the second pressure roller approach each other;

a second compression mechanism capable of applying a load to at least one of the second main bearing and the fourth main bearing in a direction in which the first pressure roller and the second pressure roller approach each other;

a first bend mechanism capable of applying a load to at least one of the first bend bearing and the third bend bearing in a direction in which the first pressure roller and the second pressure roller are separated from each other;

a second bend mechanism capable of applying a load to at least one of the second bend bearing and the fourth bend bearing in a direction in which the first pressure roller and the second pressure roller are separated from each other; and a thickness meter provided on an exit side of the first pressure roller and the second pressure roller and detecting a thickness of the electrode plate of the secondary battery at three or more points in a width direction of the electrode plate, wherein the thickness meter detects the thickness of the electrode plate of the secondary battery at each of a first point, a second point, and a third point arranged in the width direction of the electrode plate, the control device comprising:

a calculator structured to calculate setting values of the first compression mechanism, the second compression mechanism, the first bend mechanism, and the second bend mechanism on the basis of a first point thickness measurement value at the first point, a second point thickness measurement value at the second point, and a third point thickness measurement value at the third point based on detection values of the thickness meter and a thickness target value, wherein the first point is set to an end portion of the electrode plate of the secondary battery on the side where the first compression mechanism is provided, the second point is set to a center portion of the electrode plate of the secondary battery, and the third point is set to an end portion of the electrode plate of the secondary battery on the side where the second compression mechanism is provided; and a controller structured to control loads of the first compression mechanism, the second compression mechanism, the first bend mechanism, and the second bend mechanism on the basis of the setting values calculated by the calculator, wherein the calculator calculates three feature amounts of a first deviation between the thickness target value and a thickness measurement value of a point closest to the first compression mechanism among the three or more points, a second deviation between the thickness target value and a thickness measurement value of a point closest to the second compression mechanism among the three or more points, and a secondary component of a thickness profile of the electrode plate, and adaptively changes the setting values of the first compression mechanism, the second compression mechanism, the first bend mechanism, and the second bend mechanism on the basis of the three feature amounts, the calculator calculates the three feature amounts of the first deviation between the first point thickness measurement value and the thickness target value, the second deviation between the third point thickness measurement value and the thickness target value, and the secondary component of the thickness profile of the electrode plate from the first point thickness measurement value, the second point thickness measurement value, the third point thickness measurement value, and the thickness target value, and the secondary component of the thickness profile of the electrode plate is defined by a difference between the second point thickness measurement value and an average value of the first point thickness measurement value and the third point thickness measurement value.

* * * * *